(12) United States Patent
Postel et al.

(10) Patent No.: US 12,201,923 B2
(45) Date of Patent: Jan. 21, 2025

(54) TREATMENT DEVICE FOR TREATING FLUIDS, MORE PARTICULARLY LIQUID FLUIDS, AND TREATMENT UNIT AND CONNECTION HEAD FOR A TREATMENT DEVICE

(71) Applicant: MANN+HUMMEL GmbH, Ludwigsburg (DE)

(72) Inventors: Martin Postel, Hassloch (DE); Christian Thalmann, Speyer (DE); Hemanth Kumar Venkatesh Nayak, Karnataka (IN)

(73) Assignee: MANN+HUMMEL GmbH, Ludwigsburg (DE)

( * ) Notice: Subject to any disclaimer, the term of this patent is extended or adjusted under 35 U.S.C. 154(b) by 532 days.

(21) Appl. No.: 17/537,999

(22) Filed: Nov. 30, 2021

(65) Prior Publication Data
US 2022/0143531 A1 May 12, 2022

Related U.S. Application Data

(63) Continuation of application No. PCT/EP2020/079648, filed on Oct. 21, 2020.

(30) Foreign Application Priority Data

Oct. 25, 2019 (DE) .................. 10 2019 128 853.3
Jan. 29, 2020 (DE) .................. 10 2020 102 167.4

(51) Int. Cl.
*B01D 27/08* (2006.01)
*B01D 27/06* (2006.01)

(52) U.S. Cl.
CPC ............ *B01D 27/08* (2013.01); *B01D 27/06* (2013.01); *B01D 2201/302* (2013.01); *B01D 2201/304* (2013.01); *B01D 2201/4007* (2013.01); *B01D 2201/4015* (2013.01)

(58) Field of Classification Search
None
See application file for complete search history.

(56) References Cited

U.S. PATENT DOCUMENTS

| 10,399,012 | B2 | 9/2019 | Thalmann et al. | |
| 2008/0237113 | A1* | 10/2008 | Jensen | B01D 27/08 |
| | | | | 210/232 |
| 2017/0292418 | A1* | 10/2017 | Thalmann | F02M 25/0224 |

* cited by examiner

*Primary Examiner* — Krishnan S Menon

(57) ABSTRACT

A fluid treatment device has an exchangeable treatment unit and a connection head. A bayonet-type connection device connects connection head and treatment unit to each other by a plug-in/rotation movement about a connection axis of the treatment device and is provided with a housing connection part and a head connection part that operatively engage each other to form a connection of the bayonet-type connection device. Housing connection part and head connection part each have a mutually complementary functional element extending circumferentially about the connection axis and operatively connectable to each other. The bayonet-type connection device has a pretension element for realizing a mechanical pretension pressing the functional elements against each other. A splash guard part is provided that covers at least the connection device.

39 Claims, 13 Drawing Sheets

TREATMENT DEVICE FOR TREATING FLUIDS, MORE PARTICULARLY LIQUID FLUIDS, AND TREATMENT UNIT AND CONNECTION HEAD FOR A TREATMENT DEVICE

CROSS-REFERENCE TO RELATED APPLICATIONS

This application is a continuation application of international application No. PCT/EP2020/079648 having an international filing date of 21 Oct. 2020 and designating the United States, the international application claiming a priority date of 25 Oct. 2019 based on prior filed German patent application No. 10 2019 128 853.3, and further claiming a priority date of 29 Jan. 2020 based on prior filed German patent application No. 10 2020 102 167.4, the entire contents of the aforesaid international application and the aforesaid German patent applications being incorporated herein by reference to the fullest extent permitted by the law.

BACKGROUND OF THE INVENTION

The invention concerns a treatment device, in particular filter device for treatment, in particular filtration, of in particular liquid fluids, in particular fuel, oil or water, in particular of an internal combustion engine, in particular of a motor vehicle, with an exchangeable treatment unit. The invention concerns furthermore a treatment unit as well as a connection head for a treatment device.

WO 2015091665 A1 discloses a filter for filtering in particular liquid fluids, in particular fuel or oil, in particular of an internal combustion engine, with a filter pot in which a filter element is arranged and a filter head comprising an inlet and/or an outlet for the fluid. The filter head and the filter pot are connected to each other by means of a detachable bayonet-type plug-in/rotation connection. The plug-in/rotation connection comprises at least two interacting lock components, one being connected to the filter pot and one to the filter head.

SUMMARY OF THE INVENTION

It is the object of the invention to provide a treatment device with an exchangeable treatment unit in which an exchange of the treatment unit is enabled in a simple and installation space-saving way.

Further objects are providing a treatment unit as well as a connection head for such a treatment device.

The aforementioned object is solved according to an aspect of the invention by a treatment device, in particular filter device, for a fluid, in particular for a liquid fluid, with an exchangeable treatment unit, which comprises a housing with a housing pot, a housing cover, at least one inlet for the fluid to be treated, and at least one outlet for the treated fluid, and with a connection head that comprises at least one infeed for the fluid to be treated connectable to the at least one inlet and/or at least one drain for the treated fluid connectable to the at least one outlet, wherein the connection head and the treatment unit are connectable to each other by means of a detachable bayonet-type connection device by performing a plug-in/rotation movement about a connection axis of the treatment device, and the connection device comprises at least one housing connection part on the part of the housing and at least one head connection part on the part of the connection head that, for producing a connection of the connection device, are operatively connectable to each other, wherein the housing connection part and the head connection part, in circumferential direction about the connection axis, each comprise at least one mutually complementary functional element that are operatively connectable to each other, and wherein the connection device comprises at least one pretension element for realizing a mechanical pretension with which the mutually complementary functional elements can be pressed against each other. A splash guard part is provided that at least covers the connection device.

The further object is solved according to a further aspect of the invention by a treatment unit for a treatment device for connection to a connection head, which comprises a housing with a housing pot, a housing cover, at least one inlet for the fluid to be treated, and at least one outlet for the treated fluid, wherein the connection head of the treatment device is connectable to the treatment unit by means of a detachable bayonet-type connection device by performing a plug-in/rotation movement about a connection axis of the treatment device, and the connection device comprises at least one housing connection part on the part of the housing that is configured for connecting the connection device to at least one head connection part on the part of the connection head, wherein the at least one inlet is connectable to at least one infeed of the connection head for the fluid to be treated and/or the at least one outlet is connectable to at least one drain of the connection head for the treated fluid, wherein the housing connection part and the head connection part in circumferential direction about the connection axis each comprise at least one mutually complementary functional part that are operatively connectable to each other, and the connection device comprises at least one pretension device for realizing a mechanical pretension with which the mutually complementary functional elements can be pressed against each other. A splash guard part is provided that at least covers the connection device.

The further object is solved according to a further aspect of the invention by a connection head for a treatment device, for connection to a treatment unit, which comprises a housing with a housing pot, a housing cover, at least one inlet for the fluid to be treated, and at least one outlet for the treated fluid, wherein the connection head of the treatment device is connectable to the treatment unit by means of a detachable bayonet-type connection device by performing a plug-in/rotation movement about a connection axis of the treatment device, and the connection device comprises at least one head connection part on the part of the connection head that is configured for connection of the connection device with at least one housing connection part on the part of the housing, wherein at least one infeed of the connection head is connectable to the at least one inlet for the fluid to be treated and/or at least one drain of the connection head to the at least one outlet for the treated fluid, wherein the housing connection part and the head connection part in circumferential direction about the connection axis each comprise at least one mutually complementary functional part that are operatively connectable to each other, and the connection device comprises at least one pretension device for realizing a mechanical pretension with which the mutually complementary functional elements can be pressed against each other. A splash guard part is provided that at least covers the connection device.

Beneficial embodiments and advantages of the invention result from the additional claims, the description, and the drawing.

A treatment device, in particular filter device, for a fluid, in particular for a liquid fluid, with an exchangeable treatment unit is proposed, which comprises a housing with a housing pot, a housing cover, at least one inlet for the fluid to be treated, and at least one outlet for the treated fluid, and with a connection head that comprises at least one infeed for the fluid to be treated connectable to the at least one inlet and/or at least one drain for the treated fluid connectable to the at least one outlet, wherein the connection head and the treatment unit are connectable to each other by means of a detachable bayonet-type connection device by performing a plug-in/rotation movement about a connection axis of the treatment device, and the connection device comprises at least one housing connection part on the part of the housing and at least one head connection part on the part of the connection head that are operatively connectable to each other for producing a connection of the connection device, wherein, in circumferential direction about the connection axis, the housing connection part and the head connection part each comprise at least one mutually complementary functional element that are operatively connectable to each other, and the connection device comprises at least one pretension device for realizing a mechanical pretension with which the mutually complementary functional elements can be pressed against each other.

According to the invention, a splash guard part is provided that at least covers the connection device.

Advantageously, the splash guard part can protect the connection device from splashing water and dust.

According to a beneficial embodiment of the treatment device, the splash guard part can comprise between connection head and treatment unit a seal region for radial sealing and a seal region for axial sealing. In particular, both seal regions can have different diameters. Alternatively, or additionally, the splash guard part can comprise between connection head and treatment unit a seal region for axial sealing and a further seal region for axial sealing. The splash guard can have an umbrella-type shape. The region between the seal region with smaller diameter, for example, toward the connection head, and the seal region with the larger diameter, for example, the support toward the rim of the housing, can be curved outwardly as in case of a membrane. For a good deformability, the material of the splash guard part in this region can be embodied thin. The splash guard part upon mounting of the treatment unit can be pushed upwardly toward the connection head by a few millimeters, for example, 1-4 mm.

According to a beneficial embodiment of the treatment device, the seal region for axial sealing can comprise at least two seal lips that are spaced apart in radial direction. The two lips can project past the rim of the housing. Advantageously, the radial inner seal lip can serve for centering during mounting.

According to a beneficial embodiment of the treatment device, the splash guard part can comprise a membrane-type deformable region between the two seal regions. The region can be comprised of relatively thin material that is thinner than the material of the seal regions. The improved flexibility and deformability in this region facilitates mounting of the splash guard.

According to a beneficial embodiment of the treatment device, the splash guard part can comprise bulges for spring arms of the pretension element. In particular, an outer section of the spring arms can be received in a groove between lips of the splash guard part. In this way, a beneficial pretension element in the form of an inexpensive bent wire part can be employed.

According to a beneficial embodiment of the treatment device, the splash guard part can be formed of a vulcanized elastomer or a thermoplastic elastomer (TPE). It can adapt flexibly during mounting of the splash guard part and/or mounting of the pretension element.

According to a beneficial embodiment of the treatment device, the pretension element can be secured by a component of the connection device in the connection head or in the treatment unit. The splash guard part provides sufficient installation space for the pretension element.

According to a beneficial embodiment of the treatment device, the pretension element can be a spring element with at least two radially outwardly projecting spring arms which each comprise at their radially outer end face a straight section that is oriented tangentially to a rim that extends in a circular shape around the connection axis. The spring arms can be reliably covered by the bulges of the splash guard part.

Beneficially, the rim can be a rim of the housing pot when the pretension element is arranged in the connection head. As an alternative, the rim can be a rim of the connection head when the pretension element is arranged in the treatment unit.

Since with the pretension element a mechanical pretension can be realized with which the mutually complementary functional elements can be pressed against each other, the connection device can be held under a mechanical pretension. Operation-caused vibrations can thus be dampened. Also, operation-caused noises can be reduced. In particular, a possible rattling can be prevented. Moreover, a possible locking force, which must be overcome for closing or opening the locking action, can be generated or increased.

The at least one pretension element can be arranged advantageously at the connection head. In this manner, it can be configured as a lifetime component. It must not be exchanged together with the treatment unit. Alternatively, or additionally, at least one pretension element can be arranged however at the housing. It can thus be exchanged together with the treatment unit.

The at least one pretension element can advantageously be elastic. The at least one pretension element can be elastic due to its shape and/or its material composition. Advantageously, the at least one pretension element can comprise or consist of plastic material, in particular elastomer. Advantageously, the at least one pretension element can be or comprise a spring element, in particular a bent wire part. Advantageously, it can be comprised of an elastic metal.

The at least one pretension element can be star-shaped with three "spikes" or more spikes which form the spring arms that extend from a central region outwardly. Advantageously, the spring arms in cross section can be rectangularly or trapezoidally shaped.

The connection parts of the connection device can be formed from semi-finished product or form parts, in particular bent, folded, creased, cut or stamped or the like. In this manner, the corresponding lock sections and (counter) guide sections can be realized, as needed.

Advantageously, at least one part of the semi-finished product or of the form parts can be provided radially inside of the first connection parts that are formed from semi-finished product or form parts, in particular bent, folded, creased, cut or stamped or the like. Advantageously, the part of the semi-finished product or of the form parts arranged radially inside the first connection parts is closed in circumferential direction. In this way, the stability of the connection device and thus the stiffness and permanent load capacity of the connection between the connection parts can be improved.

The connection parts can be arranged advantageously radially inside of at least one circumferential wall of the housing and/or of the connection head. In this manner, the bayonet-type connection device can be protected relative to the environment. The connection device can advantageously be arranged in a corresponding connection space between the housing and the connection head.

According to a beneficial embodiment of the treatment device, at least one of the mutually complementary functional elements of the connection head and treatment device can comprise an assembly ramp that passes into a support region that is perpendicular in relation to the connection axis, and the other one of the mutually complementary functional elements comprises a slide region adjoined by a support region that is perpendicular in relation to the connection axis, wherein in a connection end position of the connection device, the two support regions are positioned on top of each other in relation to the connection axis, in particular wherein the respective support region is adjoined in circumferential direction by an end stop, in particular a lock element of at least one lock safety device, in particular a lock projection or a lock section or a recess, which lock one behind the other, with each other, or in each other in the closed position of the at least one connection device.

Due to the straight support regions, it can be achieved that a larger and more uniform support surface is available; likewise, a wear upon vibration and relative movement between the connection parts of the connection device can be reduced. The lock element serves advantageously for preventing an excess rotation of the treatment unit upon attachment at the connection head.

According to a beneficial embodiment of the treatment device, one or a plurality of support regions can be provided on at least one of the functional elements wherein a total length in circumferential direction occupies at least 20%, preferably at least 23%, especially particularly preferred at least 30%, of a corresponding circumference on the same radius of the corresponding housing connection part and/or of the head connection part. In this manner, the force flow in the components of the connection device can be improved and mechanical tensions at component rims further reduced. An enlarged and more uniform support surface of the connection device results as well as a reduced wear in operation of the treatment device.

According to a beneficial embodiment of the treatment device, an outer annular seal can be arranged radially inside of the housing connection part. Advantageously, with at least one seal device at least one fluid-conducting region of the treatment device can be sealed toward the environment. Advantageously, the outer annular seal projects past the connection device in axial direction by maximally 5 mm upwardly or downwardly. This is advantageous in relation to the installation space utilization because the seal region utilizes the axial extension of the connection device.

According to a beneficial embodiment of the treatment device, the treatment unit, in particular the housing cover and/or an end disk of a possible filter element, and the connection head each can comprise at least one correspondence element, in particular a socket, preferably an attachment socket and/or connection socket and/or seal socket and/or cylinder socket, which correspond with each other in pairs when the treatment unit is mounted. In particular, at least one pair of correspondence elements can be arranged inside of at least one other pair of correspondence elements.

In this manner, the correspondence elements can be fixed relative to each other radially in relation to the connection axis. As an alternative, the correspondence elements can be arranged in pairs so as to abut, in particular with interposition of a seal device. In this manner, radial position tolerances in relation to the connection axis can be compensated easily.

Because one pair of correspondence elements can be arranged inside of at least one other pair of correspondence elements, in the inner pair of correspondence elements a first fluid-conducting region, in particular an outlet channel for the fluid, can be realized. Between the inner pair of correspondence elements and the outer pair of correspondence elements, advantageously a second fluid-conducting region, in particular an annular inlet space for the fluid, can be realized.

The correspondence elements, in particular the pairs of correspondence elements, can be coaxial to the connection axis, respectively. In this manner, they can be positioned relative to each other more simply. Moreover, in this way the fluid-conducting regions can be more uniform circumferentially.

According to a beneficial embodiment of the treatment device, the head connection part and/or the housing connection part can be formed of sheet metal or comprise sheet metal. Sheet metal can be present in general as rolled metal in the form of planar, flat sheets or strips in its initial state. Sheet metal can be realized easily with a uniform material thickness. A mechanically stable connection part can be realized from sheet metal even with a relatively minimal material thickness. In this manner, the required installation space, in particular in axial direction, of the connection device can be reduced. Sheet metal can be worked or processed in a simple manner, in particular bent, folded, stamped, cut or welded. Connections between components, in particular crimp connections or weld connections, can be easily realized with sheet metal. Advantageously, at least one of the connection parts can be embodied as formed sheet metal part.

Advantageously, the head connection part and/or the housing connection part can be embodied not as a drawn part but as a simple bent sheet metal part. A bent part requires only low deformation degrees. The connection device can therefore be formed of a hardened material so that the head connection part and/or the housing connection part comprises an improved wear resistance. When forming the head connection part and/or housing connection part, bulges can be mostly prevented when the material is only bent.

According to a further aspect of the invention, a treatment unit is proposed for a treatment device for connection to a connection head, which comprises a housing with a housing pot, a housing cover, at least one inlet for the fluid to be treated, and at least one outlet for the treated fluid, wherein the connection head of the treatment device is connectable to the treatment unit by means of a detachable bayonet-type connection device by performing a plug-in/rotation movement about a connection axis of the treatment device, and the connection device comprises at least one housing connection part on the part of the housing that is configured for connecting the connection device to at least one head connection part on the part of the connection head, wherein the at least one inlet is connectable to at least one infeed of the connection head for the fluid to be treated and/or the at least one outlet to at least one drain of the connection head for the treated fluid, wherein, in circumferential direction about the connection axis, the housing connection part and the head connection part each comprise at least one mutually complementary functional element, respectively, that are operatively connectable to each other, and the connection device comprises at least one pretension element for realizing a mechanical pretension with which the mutually complementary functional elements can be pressed against each other.

According to the invention, a splash guard part is provided which at least covers the connection device.

According to a further aspect of the invention, a connection head for connection with a treatment unit is proposed for such a treatment device, in which according to the invention a splash guard part is provided which at least covers the connection device.

The advantages and features disclosed in connection with the treatment device according to the invention and its advantageous embodiments apply correspondingly to the treatment unit according to the invention and to the connection head according to the invention and its advantageous embodiments, and vice versa.

According to a beneficial embodiment of the treatment unit and/or of the connection head, the splash guard part for sealing between connection head and treatment unit can comprise a seal region for radial sealing and a seal region for axial sealing. In particular the two seal regions can comprise different diameters.

According to a beneficial embodiment of the treatment unit and/or of the connection head, the seal region for axial sealing can have seal lips that are spaced apart in radial direction. Advantageously, the radially inwardly arranged seal lip provides for an adjustment during mounting of the treatment unit and/or of the connection head.

According to a beneficial embodiment of the treatment unit and/or of the connection head, the splash guard part can comprise bulges for spring arms of the pretension element. In particular, an outer section of the spring arms can be received in a groove between lips of the splash guard part.

According to a beneficial embodiment of the treatment unit and/or of the connection head, the splash guard part can be formed of a vulcanized elastomer or a thermoplastic elastomer (TPE). This permits a beneficial flexible deformation during mounting of the splash guard part and/or of the pretension element.

Advantageously, the connection head can comprise circumferentially a cylindrical step that has oversize relative to the counter contour at the splash guard part so that the splash guard part can be arranged thereat with pretension for improved sealing action. In addition, the splash guard part can be supported by a collar at the connection head that additionally shields splashing water and can protect the splash guard part from mechanical damage. In the inner region, ribs can be provided that additionally clamp the splash guard part.

According to a beneficial embodiment of the treatment unit and/or of the connection head, the at least one housing connection part can comprise at least one functional element, wherein the at least one functional element is operatively connectable to at least one functional element of the head connection part, and wherein the at least one functional element comprises a support region that is perpendicular in relation to the connection axis. In particular, the at least one functional element can comprise an assembly ramp or a slide region which passes respectively into a support region that is perpendicular in relation to the connection axis. In a connection end position of the connection device, the two support regions, in relation to the connection axis, can be positioned on top of each other. The perpendicular support region enables an improved force flow in connection head-side and treatment device-side functional elements, in particular the complementary bayonet rings. Mechanical tensions at component rims are reduced. The support surface of the connection device is enlarged so that wear upon vibration and relative movement between the components of the connection device can be reduced. Also, mounting and demounting forces can be reduced. The support regions exhibit a reduced "digging in" at the contact surfaces so that the effect of wear during mounting and demounting of the treatment unit can be reduced.

According to a beneficial embodiment of the treatment unit and/or of the connection head, one or a plurality of support regions can be provided wherein a total length of the support region(s) in circumferential direction occupies at least 20% of a corresponding circumference on the same radius of the housing connection part, preferably at least 23%, especially particularly preferred at least 30%, of the corresponding housing connection part and/or of the head connection part. In this manner, the force flow in the components of the connection device can be improved and mechanical tensions at component rims can be further reduced. An enlarged and more uniform support surface of the connection device results.

According to a beneficial embodiment of the connection head, the pretension element can be secured by the head connection part in the connection head. Alternatively, according to a beneficial embodiment of the treatment unit, the pretension element can be secured by the housing connection part at the housing cover of the treatment unit.

This provides for a compact configuration and an attachment of the pretension element without additional components.

Advantageously, the housing cover can be in particular elastically deformable. It can thus be pressed by excess pressure existing in the housing, in particular upon operation of the treatment device, against the connection head or against a cover ring. The connection head can thus support the housing cover. In this way, the requirements in regard to pressure stability of the housing cover can be reduced. The housing cover can thus be realized more simply, in particular of simpler materials.

Advantageously, the treatment unit can be an exchangeable filter, in particular an exchangeable oil filter or an exchangeable fuel filter. The housing of the treatment unit can then be a filter housing. Advantageously, at least one filter element can be arranged in the filter housing so that it can separate the at least one inlet from the at least one outlet. The connection head can advantageously be a filter head at which the exchangeable filter, in particular the filter housing, can be detachably mounted by means of the connection device.

An exchangeable filter is usually a filter in which the at least one filter element is exchanged together with the filter housing. In general, the at least one filter element is arranged fixedly in the filter housing. Correspondingly, the connections between housing pot and housing cover must not be detachable in a nondestructive way.

The invention is not limited to a treatment device of an internal combustion engine of a motor vehicle. Instead, it can also be used in other types of internal combustion engines, in particular industrial motors. The invention can also be used for other types of treatment devices for fluid within or outside of the automotive technology. The invention can also be used for air/oil separation boxes or drying agent boxes.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to expedient further combinations.

DESCRIPTION OF PREFERRED EMBODIMENTS

Figure 1:
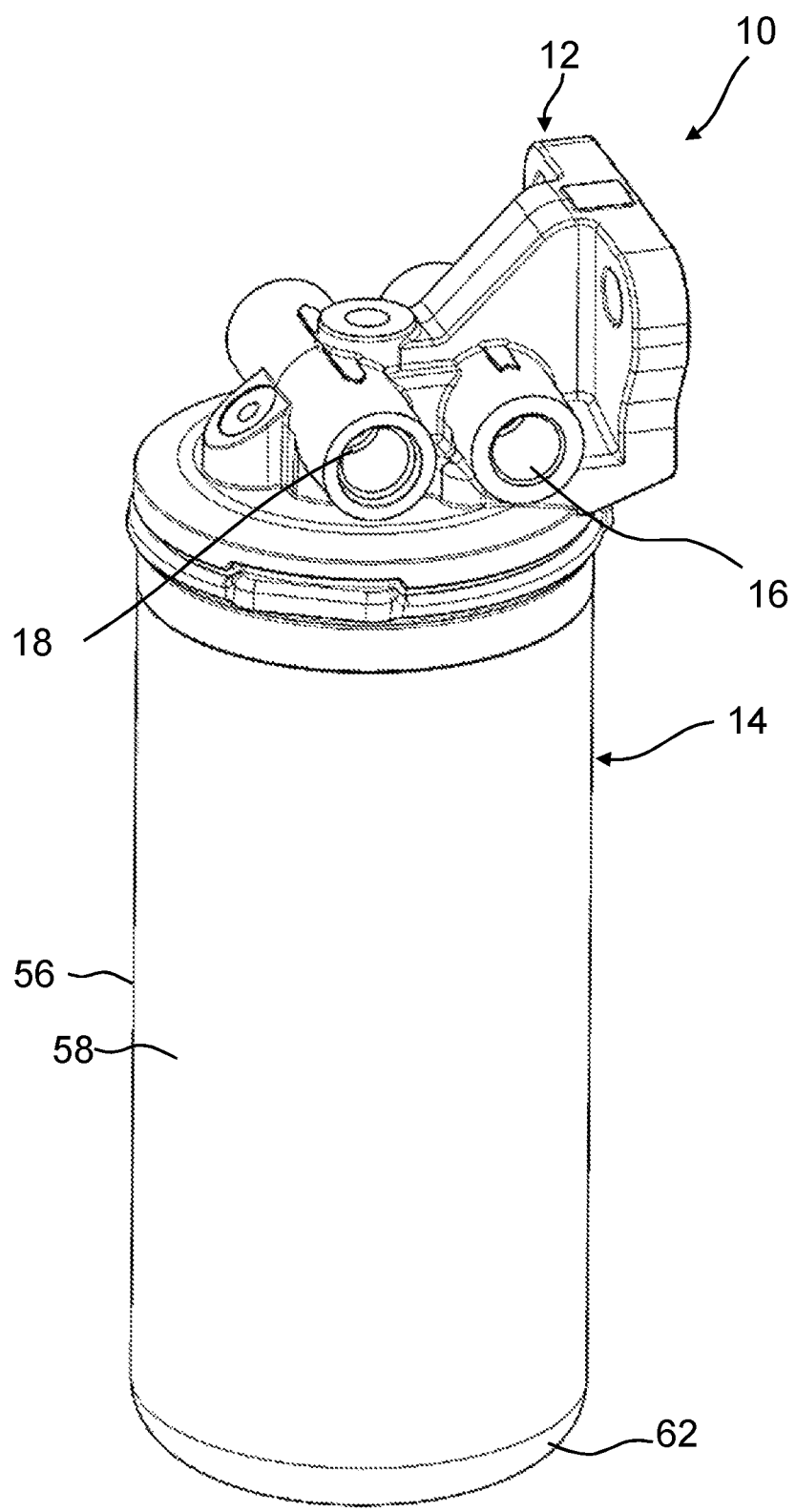
FIG. 1 shows an isometric illustration of a treatment device according to an embodiment of the invention, in particular of a filter device for motor oil of an internal combustion engine of a motor vehicle, with a treatment unit and a connection head.

In the Figures, same or similar components are identified with same reference characters In FIGS. 1 to 17, a first embodiment of a treatment device 10 in the form of a filter device for a liquid fluid, for example, motor oil of a motor oil circuit of an internal combustion engine of a motor vehicle, and its components in different perspectives, sections, and detail views is shown. The treatment device 10 serves for purifying the motor oil, for example.

Figure 2:
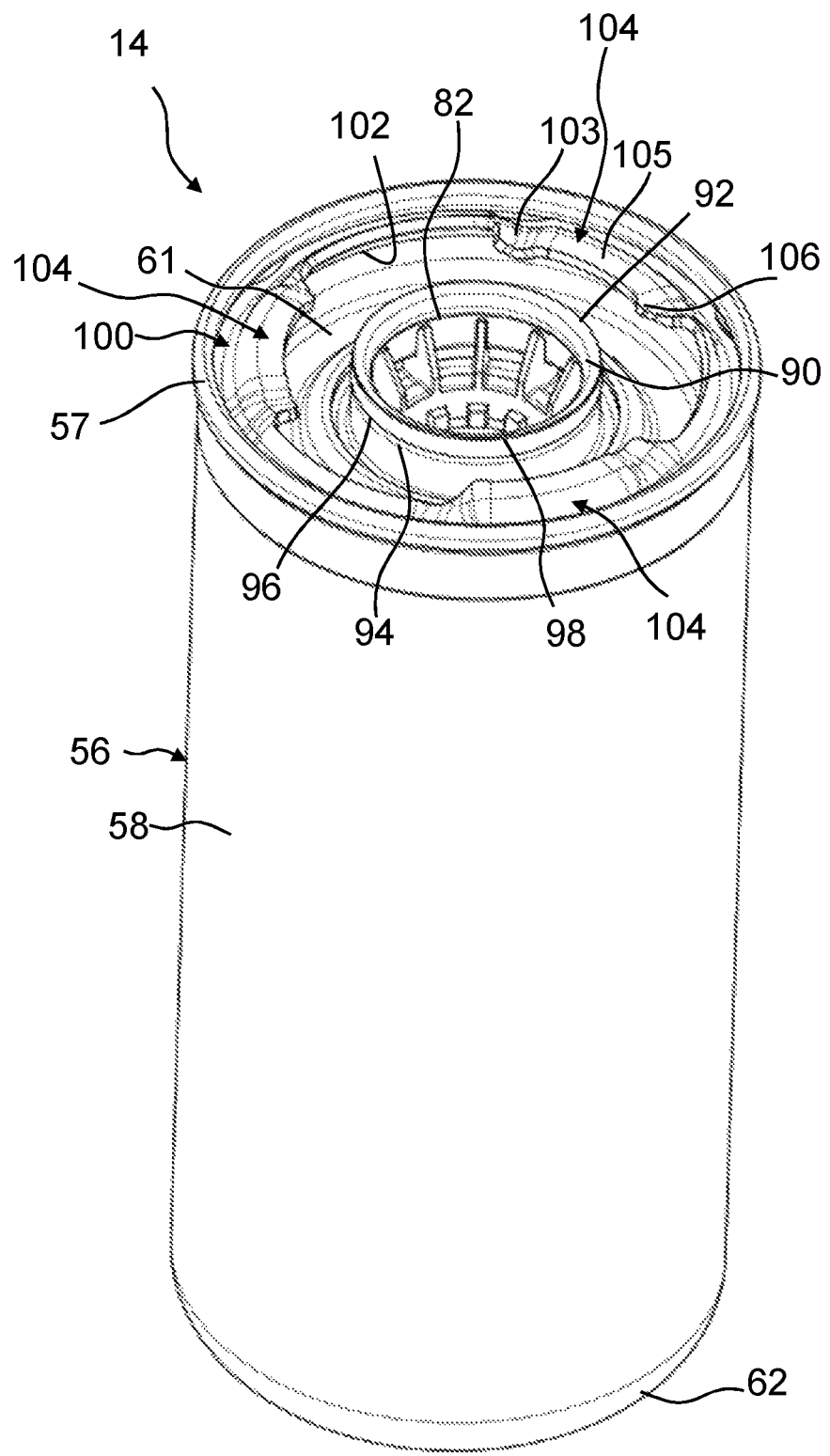
FIG. 2 shows an isometric illustration of the treatment unit according to FIG. 1 with top view of the housing connection part.
Figure 3:
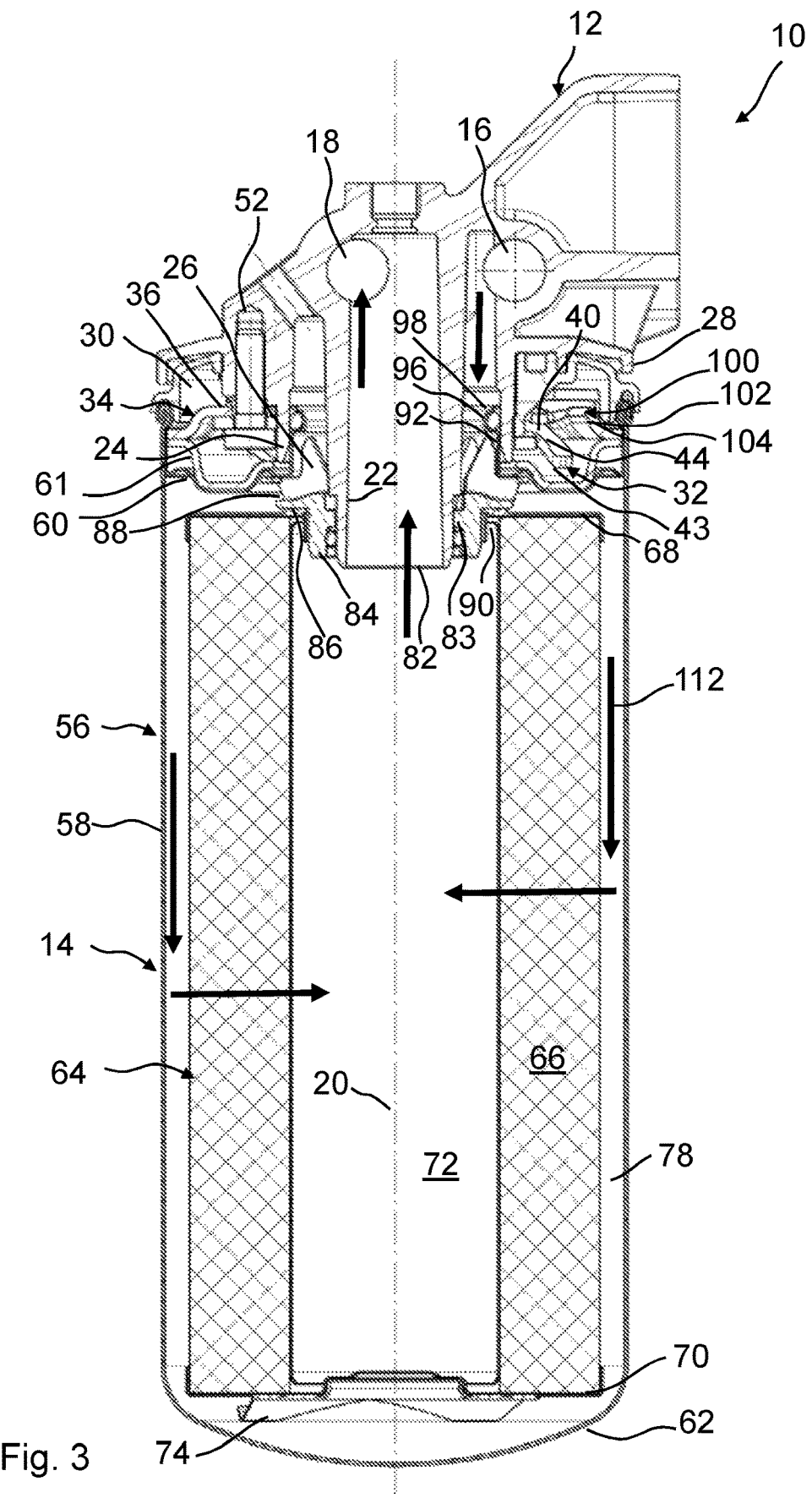
FIG. 3 shows a longitudinal section of the treatment device according to FIG. 1.
Figure 4:
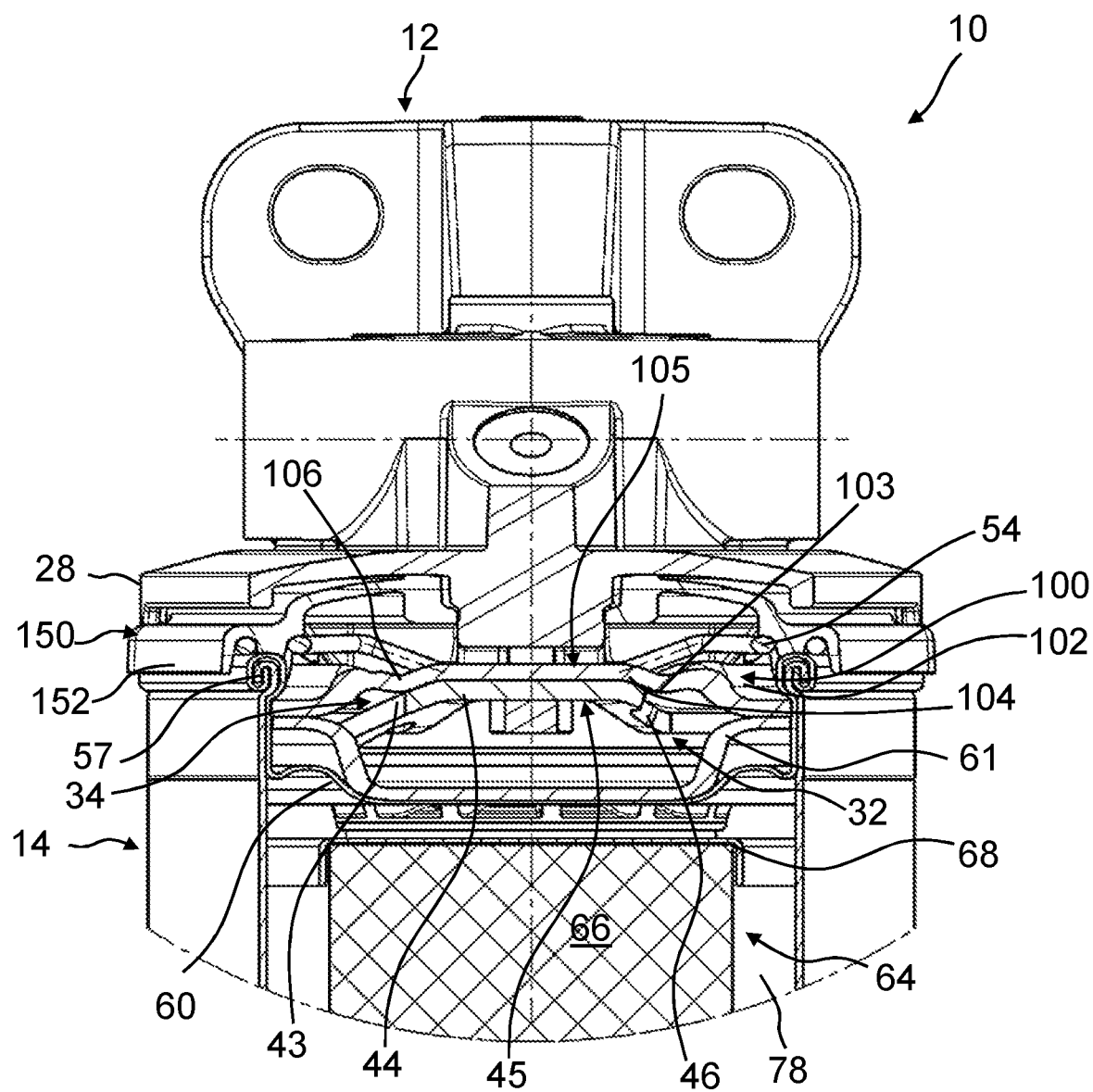
FIG. 4 shows a detail view of the treatment device according to FIG. 1 with sectioned housing.
Figure 5:
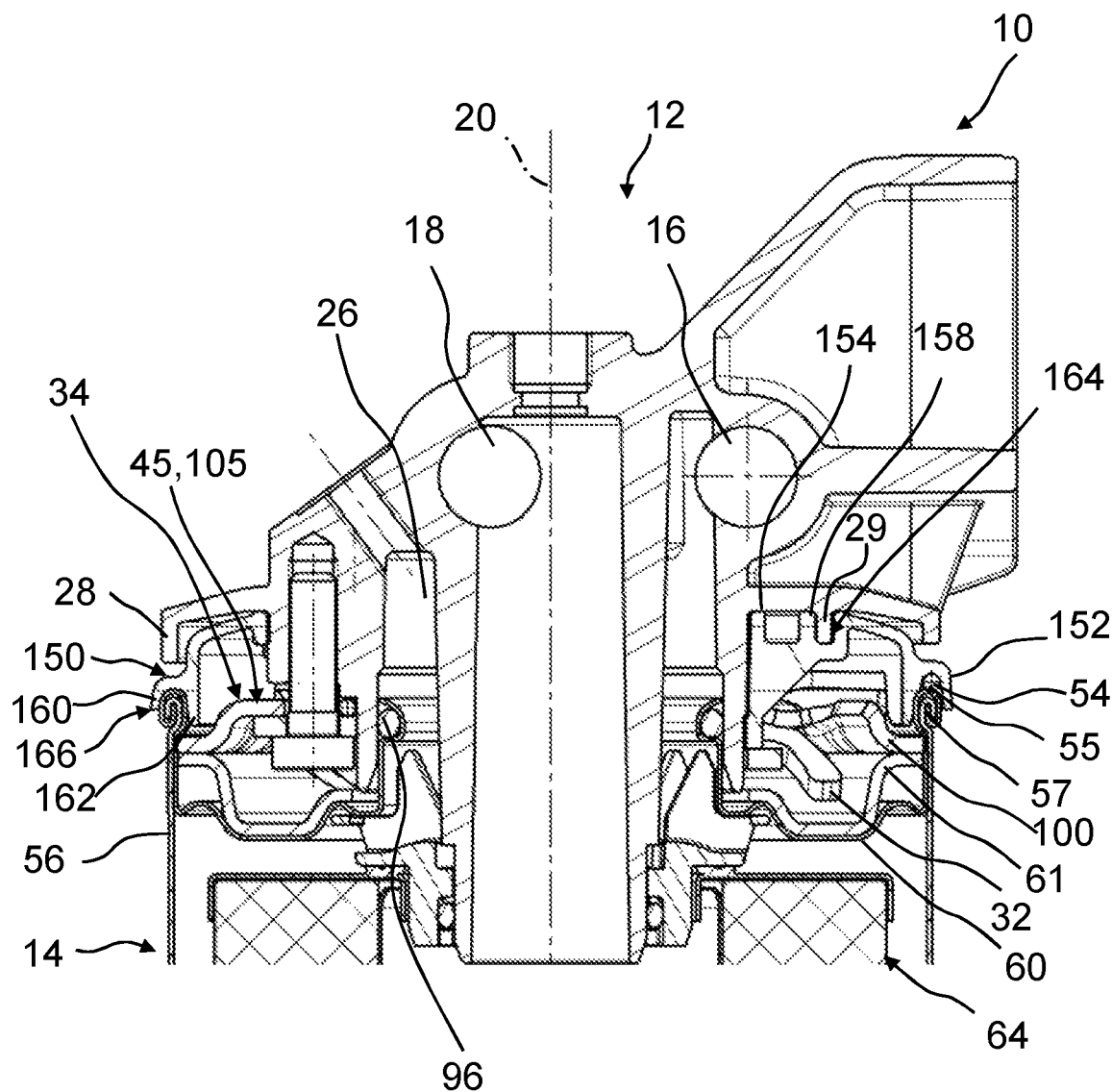
FIG. 5 shows a detail view of the treatment device according to FIG. 1 in the region of the connection head treatment unit as longitudinal section.

FIG. 1 shows an isometric illustration of the treatment device 10 with a treatment unit 14 and a connection head 12. FIG. 2 shows an isometric illustration of the treatment unit 14 with top view of a housing connection part 100. FIG. 3 shows a longitudinal section of the treatment device 10. FIG. 4 shows a detail view of the treatment device 10 with sectioned housing 56. FIG. 5 shows as a longitudinal section a detail view of the treatment device 10 in the region of the connection head 12 and housing 56.

According to a beneficial embodiment of the treatment unit 14, the housing connection part 100 can be fixedly connected at the outer rim to a stable cover ring 61 of the housing cover 60, in particular by material fusion, in particular welded. Advantageously, laser welding or projection welding can be employed. Optionally, the connection can also be produced by soldering. Advantageously, due to the fixed areal connection, a risk of breakage of the housing connection part 100 due to loading that acts over the service life, for example, by vibration loading, can be reduced. Beneficially, the shape of the housing cover 60 can also be matched to the shape of the cover ring 61 in order to achieve a greater tensile strength of the housing connection part 100.

The treatment device 10 comprises the connection head 12 in form of a filter head at which an exchangeable filter as treatment unit 14 is detachably fastened. The connection head 12 is connected fixedly to the internal combustion engine and serves as an attachment part for the treatment unit 14. The connection head 12 is illustrated in two embodiments in detail in FIGS. 6 and 13. The connection head 12 comprises an infeed 16 and a drain 18 for the motor oil. The infeed 16 and the drain 18 are connected to corresponding oil conduits of the internal combustion engine, not explained here in detail.

The connection head 12 comprises moreover an attachment socket 22 that is coaxial and radially inward in relation to a connection axis 20.

When in the following "axial", "radial", "coaxial", "circumferential" or the like is mentioned, this relates to, if nothing to the contrary is indicated, the connection axis 20. In the illustrated embodiment, the connection axis 20 coincides with a filter axis of the treatment unit 14.

The inner attachment socket 22 is approximately circular cylindrical. It extends on the side of the connection head 12 which is facing the treatment unit 14. It is open at both its end faces. At its side which is facing away from the treatment unit 14, the inner attachment socket 22 is connected in fluid communication to the drain 18.

The inner attachment socket 22 is surrounded coaxially by a circular cylindrical, radially outer attachment socket 24. The inner attachment socket 22 projects in axial direction past the outer connection socket 24 at the side facing the treatment unit 14. The inner attachment socket 22 and the outer attachment socket 24 delimit respectively circumferentially a coaxial annular inlet space 26. The annular inlet space 26 is connected by a fluid connection to the infeed 16.

The inner attachment socket 22 and the outer attachment socket 24 are surrounded coaxially by a circular cylindrical circumferential wall 28. The free rim of the circumferential wall 28 which is facing the treatment unit 14 is located approximately at the same axial level as the free rim of the outer attachment socket 24. The attachment socket 24 projects past the circumferential wall 28 slightly in the direction toward the treatment unit 14.

Figure 6:
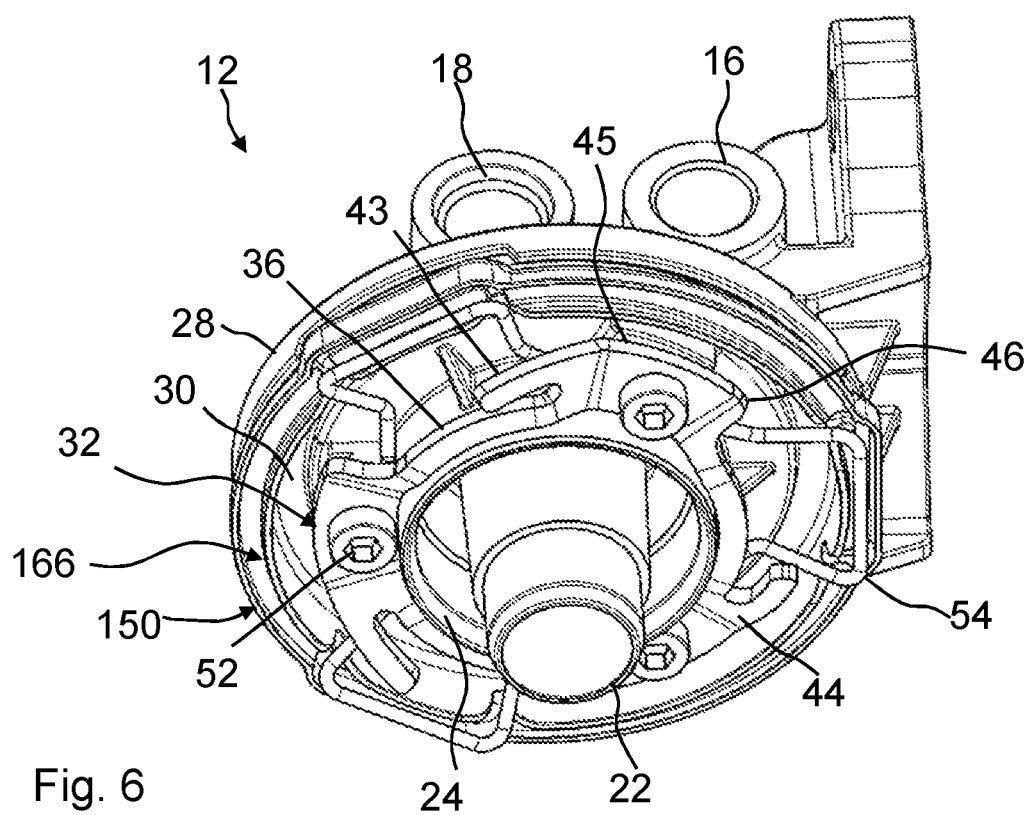
FIG. 6 shows an isometric illustration of the connection head of the treatment device according to FIG. 1 with a view of the head connection part in the interior of the connection head.
Figure 7:
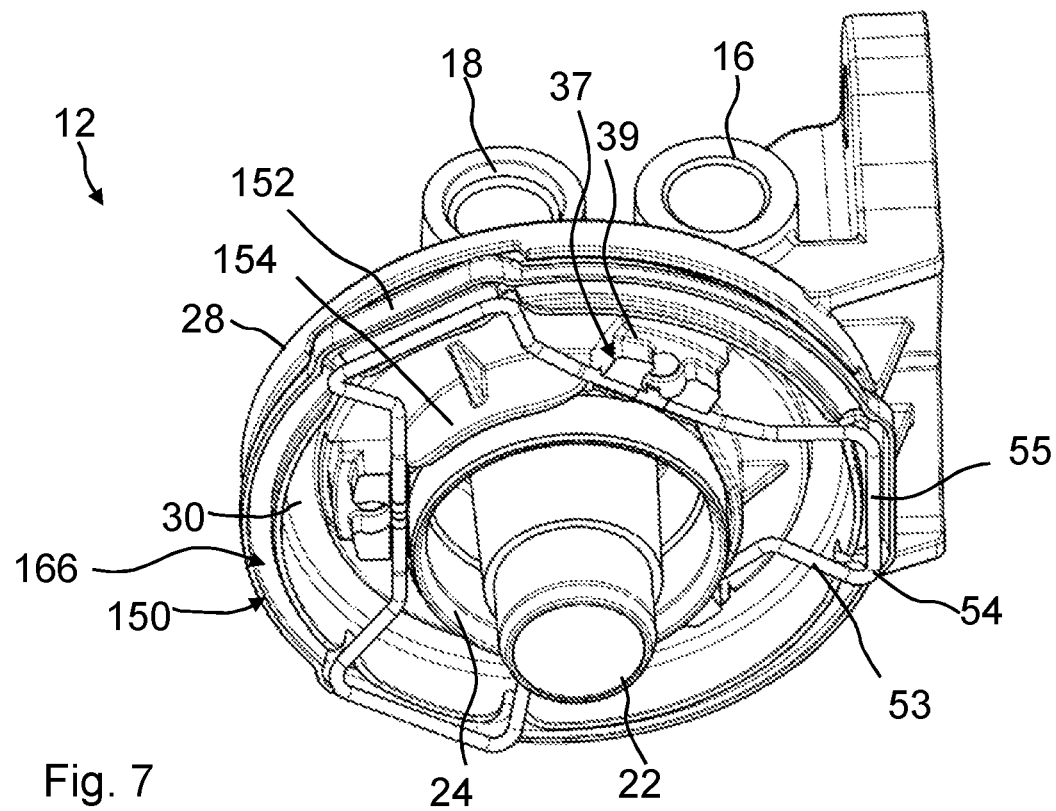
FIG. 7 shows the connection head according to FIG. 6 with exposed pretension element without head connection part.
Figure 8:
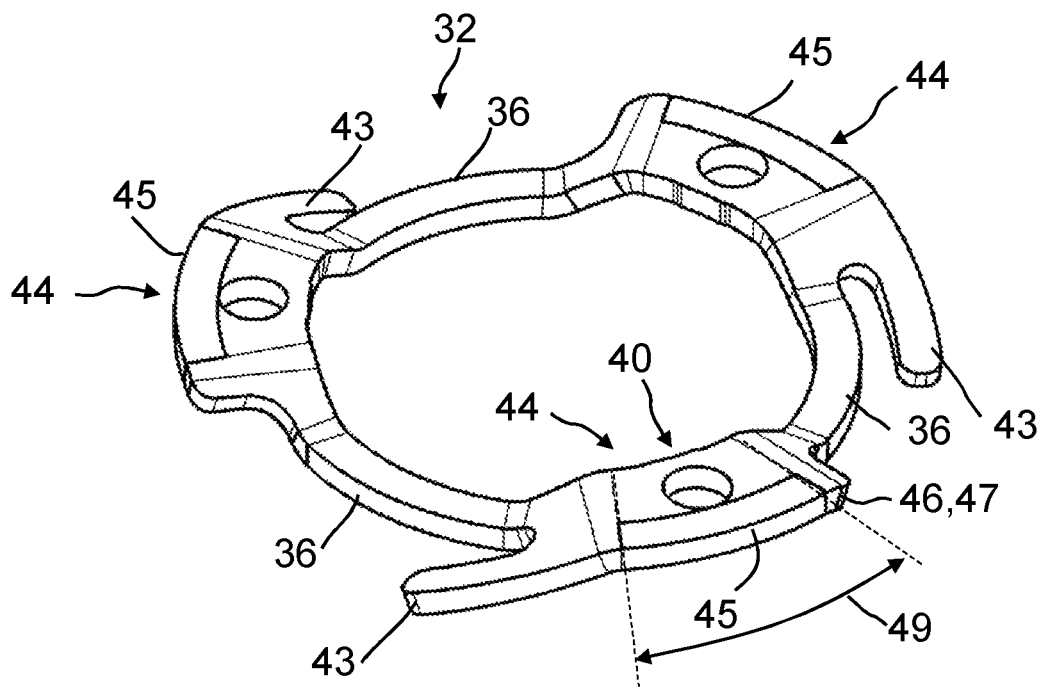
FIG. 8 shows an isometric illustration of the head connection part according to FIG. 6.
Figure 9:
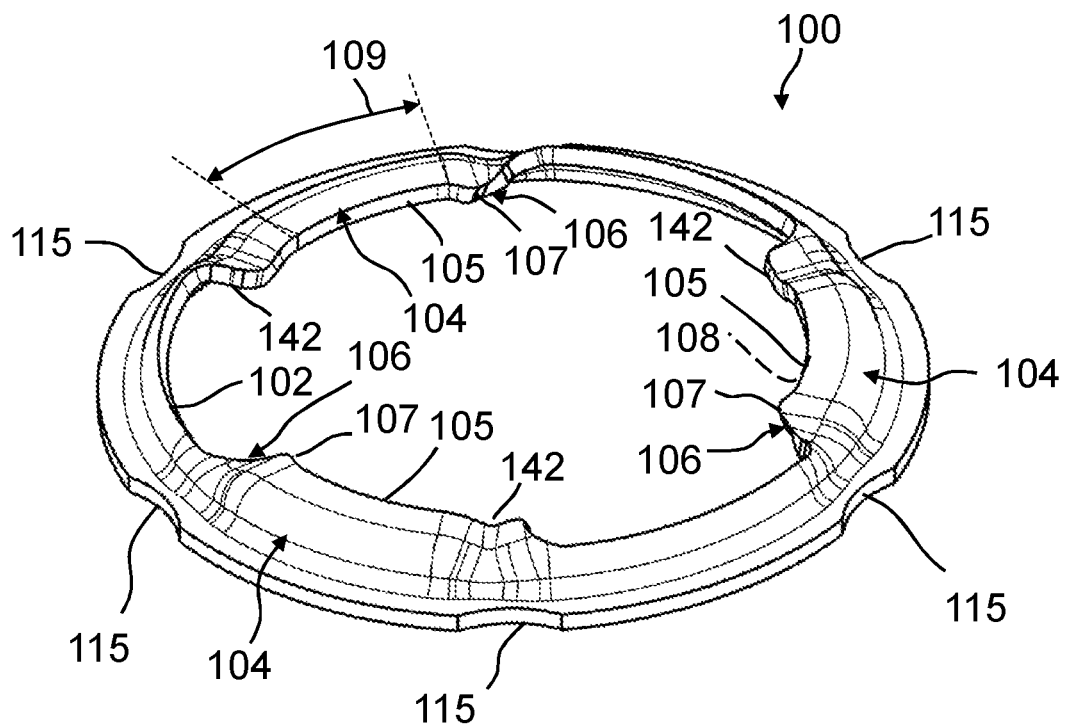
FIG. 9 shows an isometric illustration of the housing connection part according to FIG. 2.
Figure 10:
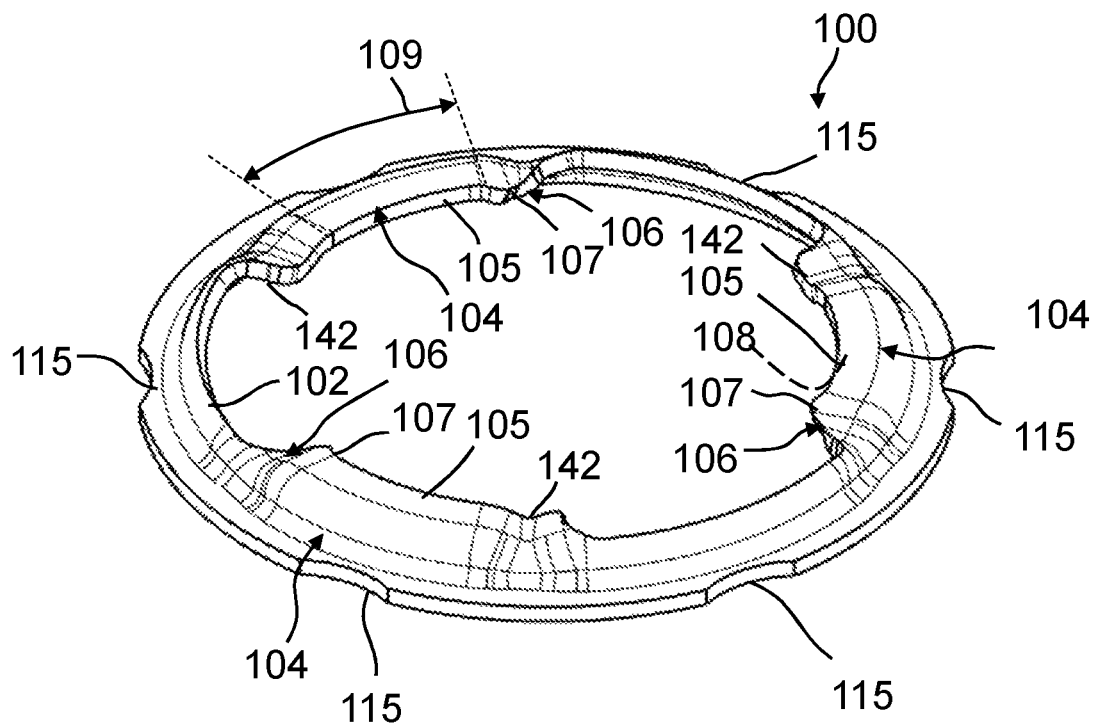
FIG. 10 shows an isometric illustration of a variant of the housing connection part according to FIG. 9.

FIG. 6 shows an isometric illustration of the connection head 12 of the treatment device 10 according to FIG. 1 with a view of the head connection part 32 in the interior of the connection head 12. FIG. 7 shows the connection head 12 with exposed pretension element 54 without head connection part 32. FIG. 8 shows an isometric illustration of the head connection part 32 according to FIG. 6. FIG. 9 shows an isometric illustration of the housing connection part 100 that is complementary thereto and is illustrated in FIG. 10 in a variant.

Figure 13:
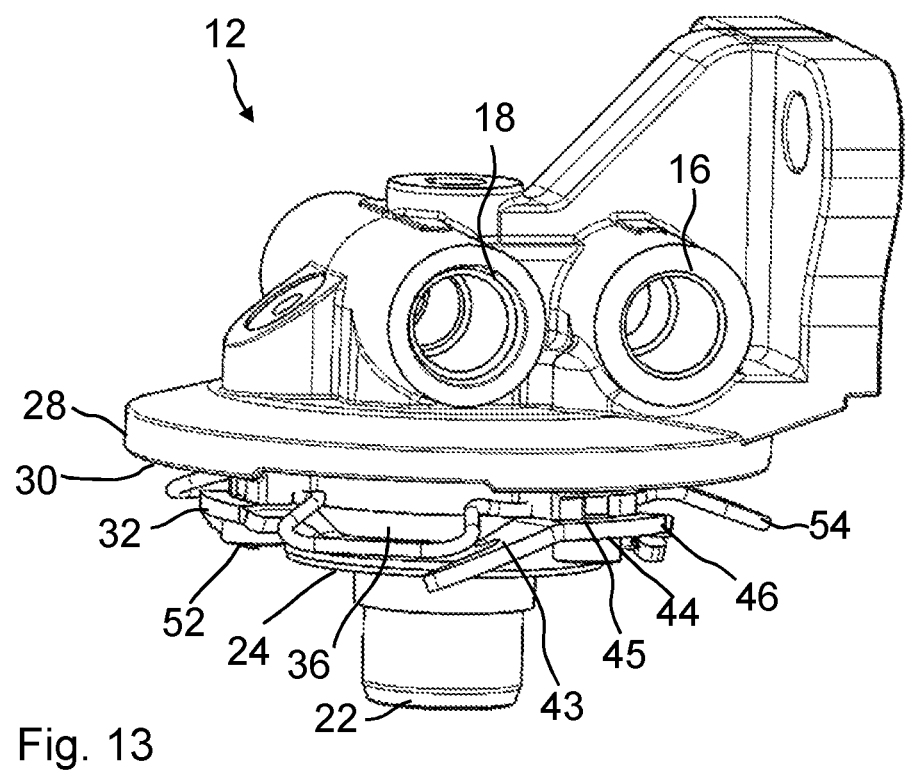
FIG. 13 shows an isometric illustration of a connection head for a treatment device according to FIG. 1 without splash guard with recognizable pretension element.

In the embodiment of the connection head 12 according to FIG. 6, the circumferential wall 28 forms a radially outer boundary of an axially outer part of the connection head 12 at the side which is facing away from the treatment unit 14. A splash guard part 150 is arranged so as to be partially covered by the circumferential wall 28. The splash guard part 150 is manufactured, for example, of vulcanized elastomer or thermoplastic elastomer (TPE). The splash guard part 150 and the outer attachment socket 24 each delimit circumferentially an annular coaxial connection space 30. In FIG. 13, a connection head 12 of the same configuration without splash guard part is illustrated.

In the connection space 30, a head connection part 32 of a detachable bayonet-type connection device 34 is arranged. By means of the connection device 34, the treatment unit 14 is detachably fastened to the connection head 12. For this purpose, a complementary housing connection part 100 is arranged in the treatment unit 14.

The overall approximately annular head connection part 32 is preferably formed of sheet metal. The thickness of the sheet metal is constant at approximately 2 to 3 mm.

Radially inwardly, the head connection part 32 comprises an annular head assembly section 36. The head assembly section 36 abuts with its radial inner circumferential side approximately against the radially outer circumferential side of the outer attachment socket 24. The head assembly section 36 extends radially and circumferentially approximately in a plane. The head connection part 32 extends radially approximately to the center of the connection space 30.

The head assembly section 36 in this example passes into three head-side functional elements 44 in the form of bayonet sections which can be seen in the detail illustration of FIG. 8. In place of the three functional elements 44, also four or five can be provided.

Advantageously, the head connection part 32 and/or the housing connection part 100 can be embodied not as a drawn part but as a simple bent sheet metal part. A bent part requires only minimal deformation degrees. The connection device 34 can be formed of a harder material so that the head connection part 32 and/or the housing connection part 100 exhibit an improved wear resistance. When forming head connection part 32 and/or housing connection part 100, bulges can be mostly prevented when the material is only bent.

In the unformed state, the head assembly sections 36 of the head connection part 32 are, for example, not of a circular section shape as in FIG. 8 but in radial direction slightly curved outwardly. In particular, the head assembly sections 36 can have a slightly different, in particular larger, diameter than the circumferential section 40. Typically, the difference in diameters can lie at approximately 1 mm. When bending the sheet metal, the material shrinks only in the head assembly sections 36 so that the head assembly sections 36 pull radially inwardly. The supporting regions of the functional elements 44, on the other hand, remain practically unaffected.

The housing connection part 100 comprises only a minimal curvature so that the housing connection part 100 comprises an axial extension of only a few millimeters, for example, maximally 6 mm, preferably maximally 4 mm, particularly preferred maximally 3 mm.

The head assembly sections 36 have in radial direction a reduced width compared to the head-side bayonet sections in the form of the functional elements 44. The head-side functional elements 44 are identical in shape and size. The head-side functional elements 44 are arranged uniformly distributed in circumferential direction. The head-side functional elements 44 each comprise a circumferential section 40 which extends substantially circumferentially parallel to an imaginary circular cylinder wall about the connection axis 20. The circumferential section 40 comprises a flat support region 45 that is arranged perpendicularly to the connection axis 20. The respective functional element 44 comprises an assembly ramp 43 extending in axial direction at a slant and passing into the flat support region 45 that ends at a lock element 46 as an end stop 47 adjoined by a recess relative to the neighboring head assembly section 36.

The circumferential sections 40 connect thus the head assembly sections 36 to the respective assembly ramps 43. The assembly ramps 43 are easily visible in particular in FIG. 8.

Each one of the flat support regions 45 comprises an extension 49 in circumferential direction. The flat support regions 45 of all functional elements 44 of the head connection part 32 occupy a total length in circumferential direction of at least 20% of a corresponding circumference on the same radius of the head connection part 32, preferably at least 23%, particularly preferred at least 30%.

The assembly ramps 43 each have an approximately screw-shaped course about the connection axis 20. The gradient of the assembly ramps 43 extending at a slant corresponds approximately to the gradient of a conventional right-hand thread. Viewed axially from the treatment unit 14, the free ends of the assembly ramps 43 leading in clockwise direction are closer to the treatment unit 14 than the rearward ends in clockwise direction, respectively. Between the leading ends of the assembly ramps 43 and the plane of the head assembly section 36, there is a respective gap through which the corresponding complementary housing-side functional elements 104 in the form of bayonet sections can be inserted, which will be explained in more detail below.

The sheet metal of the head connection part 32 is of the same thickness in the head assembly section 36, in the circumferential sections 40, and in the assembly ramps 43. This means also that it has a uniform axial expansion in the head assembly section 36 and in the assembly ramps 43.

The functional elements 44 each comprise a head-side lock projection 46. The lock projections 46 are realized as respective bends in the functional elements 44. The lock projections 46 project axially at the side which is facing the treatment unit 14.

The treatment unit 14 is detachably fastened at the connection head 12 by means of the connection device 34. For this purpose, a complementary housing connection part 100 that comprises complementary functional elements 104 is arranged in the treatment unit 14. FIG. 9 shows an isometric illustration of the housing connection part 100 according to FIGS. 2-5 that interacts with the head connection part 32. In FIG. 10, a variant of the housing connection part 100 is illustrated.

The housing connection part 100 of the connection device 34 is formed as an annular coaxial element preferably from sheet metal. A thickness of the sheet metal of the housing connection part 100 corresponds approximately to the thickness of the sheet metal of the head connection part 32.

The housing connection part 100 extends radially from the radially outer circumferential side of a stable cover ring 61 arranged on the housing cover 60 (FIGS. 4, 5) past the radial center of the connection space 30. The housing connection part 100 overlaps the head connection part 32. The cover ring 61 absorbs the inner pressure of the treatment unit 14.

The housing connection part 100 comprises a housing assembly section 102 which extends radially and circumferentially approximately in a plane. The housing assembly section 102 is fixed radially outwardly axially between the housing cover 60 and a crimp connection as a rim 57 of the housing pot 58 to the housing cover 60. It is resting on a side flat against the cover ring 61 of the housing cover 60. The assembly section 102 can be connected by material fusion to the cover ring 61 at the rim, for example, can be welded.

The housing assembly section 102 passes on its radially inner side into three identical housing-side functional elements 104 in the form of bayonet sections. The housing-side functional elements 104 are arranged uniformly distributed in circumferential direction. They have approximately the shape and size of the head-side functional elements 44 that are complementary thereto. Instead of the three functional elements 104, also four or five can be provided.

The housing-side functional elements 104 act complementarily to the functional elements 44 and comprise each a flat support region 105 as well as a slide region 142 at a circumferential end of the support region 105 and an end stop 107 in the form of a small slightly inwardly projecting pin as well as a lock element 106 at the oppositely positioned circumferential end of the support region 105. The end stop 107 abuts at an edge 37 of a threaded element 39 (FIG. 7) in the connection head 12 and prevents excess rotation during assembly. When producing the connection between head connection part 32 and housing connection part 100, the slide regions 142 slide on the assembly ramps 43 of the housing-side head connection part 32. The lock elements 106 enable locking of the housing connection part 100 at the lock elements 46 of the head connection part 32.

The respective flat support region 105 comprises a contact surface 108 which is arranged at the side of the support region 105 that is not visible in FIG. 9 and which, when the connection is produced with the head connection part 32, rest against the straight support regions 45 of the functional elements 44. Each flat support region 105 comprises an extension 109 in circumferential direction. The flat support regions 105 of all functional elements 104 occupy a total length in circumferential direction of at least 20% of a corresponding circumference on the same radius of the housing connection part 100, preferably at least 23%, especially particularly preferred at least 30%.

The contact surfaces 108 of the straight support regions 105 are located at the side of the respective housing-side functional element 104 which is facing the cover ring 61 of the housing cover 60. In the closed state of the connection device 34, the contact surfaces 108 are engaged from behind for interaction by one of the head-side functional elements 44, respectively. In this context, the contact surfaces 108 of the straight support regions 105 are resting flat against the corresponding flat regions 45 of the functional elements 44.

At its outer circumference, the housing connection part 100 comprises notches 115 which in the mounted state provide an anti-rotation protection. In the embodiment according to FIG. 9, the notches 115 are arranged at both sides of the functional elements 104. In the embodiment according to FIG. 10, the notches 115 are rotated by approximately 30° and arranged approximately centrally in the straight section 105 and the housing assembly section 102, respectively.

Due to the crimp connection between housing cover 60 and the housing pot 58, the crimp pulls the housing cover 60 into the notches 115 so that a robust anti-rotation safety is provided.

The housing-side functional elements 104 each comprise a housing-side lock projection 106. The lock projections 106 projects axially away from the cover ring 61 of the housing cover 60. When the treatment unit 14 is mounted, the housing-side lock projections 106 lock behind the corresponding head-side lock projections 46.

For attachment, the treatment unit 14 is pushed, with the housing cover 60 or the cover ring 61 of the housing cover 61 leading, coaxially onto the attachment side of the connection head 12.

Figure 11:
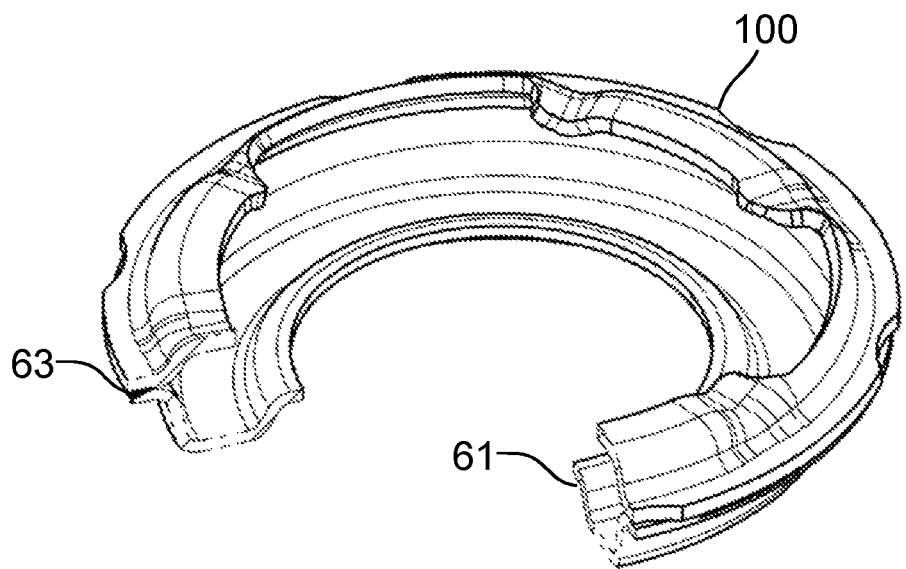
FIG. 11 shows a partially sectioned illustration of a variant of the housing connection part according to FIG. 10 connected with a cover ring of the housing cover.
Figure 12:
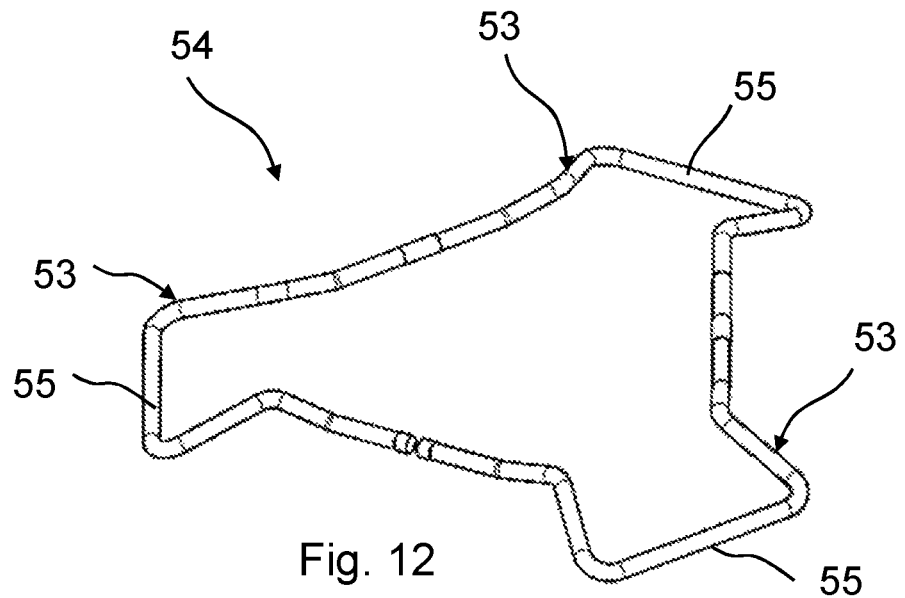
FIG. 12 shows a top view of the pretension element according to FIG. 6.

FIG. 11 shows a partially sectioned illustration of a variant of the housing connection part 100 according to FIG. 10 that is fixedly connected at the outer rim 63 to a cover ring 61 of the housing cover 60, for example, is welded. Advantageously, laser welding or projection welding can be employed. Optionally, the connection can also be produced by soldering. Advantageously, due to the fixed areal connection, a risk of breakage of the housing connection part 100 due to loading acting over the service life, for example, by a vibration load, can be reduced. In the embodiment illustrated in FIG. 11, the outer rim 63 of the cover ring 61 is extended upwardly in order to form the connection with the housing connection part 100. From the outer rim 63 radially inwardly, the cover ring 61 has a depression whose inner rim is extended upwardly also. In this manner, a great stiffness of the cover ring 61 can be achieved. The housing connection part 100 and the cover ring 61 are positioned in the outer region. The outer rim 63 is the region in which the parts are melted in order to connect them. Even in case of a non-welded embodiment, the inner rim of the depression is extended upwardly also.

The head connection part 32 is fastened to the connection head 12 at the head assembly section 36 with a total of three screws 52, as illustrated in FIGS. 6 to 8, from the side that is facing the treatment unit 14. The screws 52 are located centrally in the circumferential sections 40, respectively, and are screwed into the threaded elements 39 (FIG. 7).

In the connection space 30, moreover a pretension element 54 is coaxially arranged. The pretension element 54 can be seen in detail in FIG. 12. FIGS. 6 and 7 permit viewing of its installed position in the head connection part 32. In the connection head 12, the pretension element 54 is placed with slight clearance into a groove and secured by the screwed-on head connection part 32. In this way, the open spring ends of the pretension element 54 are secured also.

The pretension element 54 is embodied as a bent wire part and is resting against two to five regions at the connection head 12 or at the motor or vehicles side and against two to five regions at the rim 57 of the housing pot 58 of the treatment unit 14. The rim 57 of the housing pot 58 can be embodied as a crimp, for example. The support region of the pretension element 54 relative to the rim 57 of the treatment unit 14 has a straight region 55 which is embodied tangentially to the rim of the housing pot 58. The contour of the outwardly oriented spring arm 53 corresponds approximately to a rectangle or trapezoid. In this way, for each contact region of the spring arms 53, three contact points are provided: two contact points where the respective spring arm 53 crosses the rim 57 and one contact point at the center of the straight region 55. The pretension element 54 is shaped such that the spring arms 53 are resting as flat as possible on the rim 57 of the housing pot 58, for example, the crimp.

The pretension element 54 comprises at least two, in this embodiment three spring arms 53. The spring arms 53 are distributed uniformly about the circumference. The spring arms 53 extend in relation to the connection axis 20 in the same rotational direction as the assembly ramps 43 of the head connection part 32. They are bendable in axial direction in a spring-elastic manner.

In operation, a slight relative movement between pretension element 54 and rim 57 is generated due to vibrations. The straight region 55 enables a more uniform contact and thus a more uniform wear as well as a reduced digging in of the pretension element 54. A reduced detachment moment is also realizable. Moreover, a scaling to different diameters of treatment units 14, which produce different vibration loads due to different masses, can be achieved.

Figure 14:
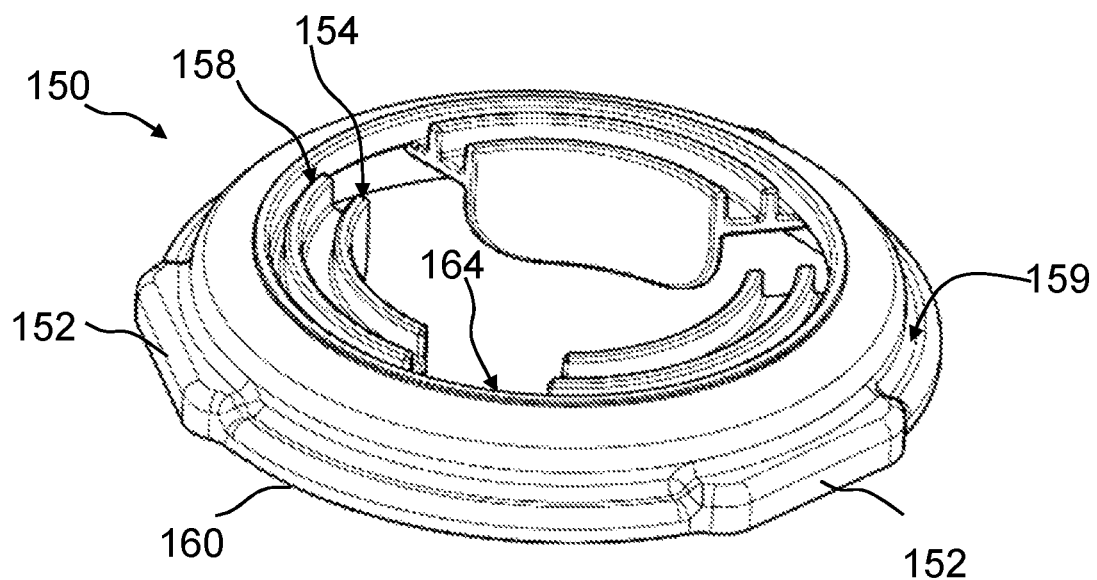
FIG. 14 shows an isometric illustration of the splash guard for the head connection part according to FIG. 6 with a view of its exterior side.
Figure 15:
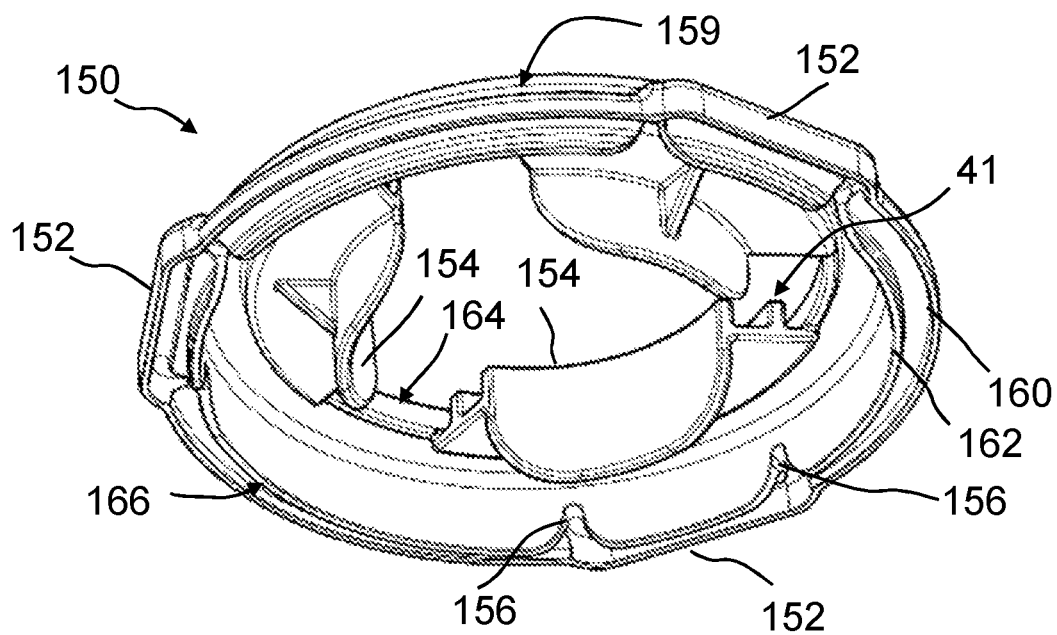
FIG. 15 shows an isometric illustration of the splash guard for the head connection part according to FIG. 6 with a view of its interior side.
Figure 16:
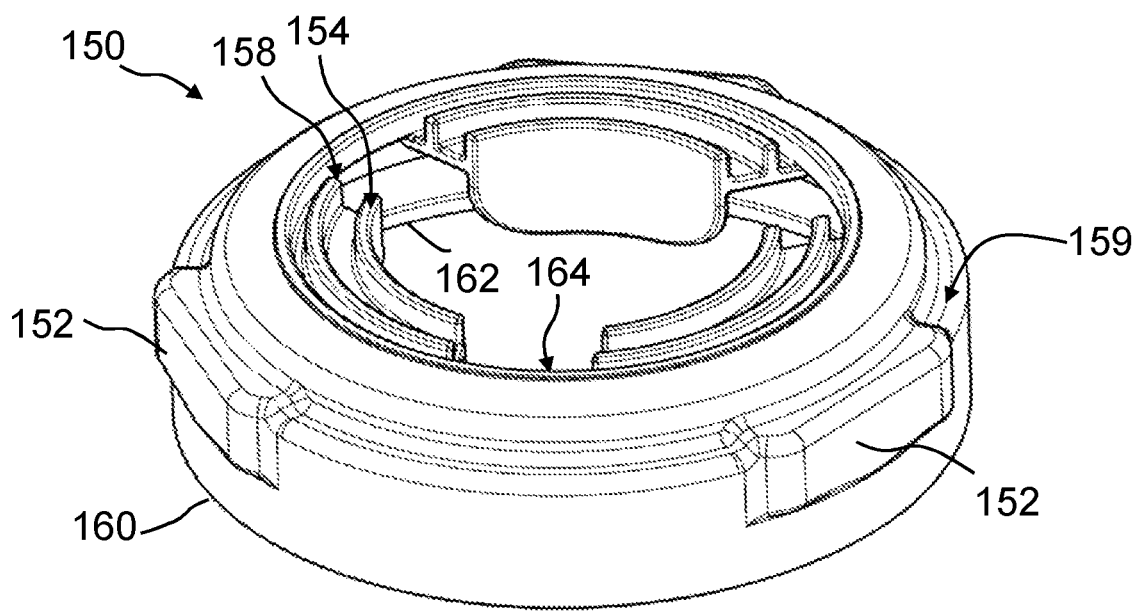
FIG. 16 shows an isometric illustration of a variant of the splash guard for the head connection part according to FIG. 6 with a view of its exterior side.
Figure 17:
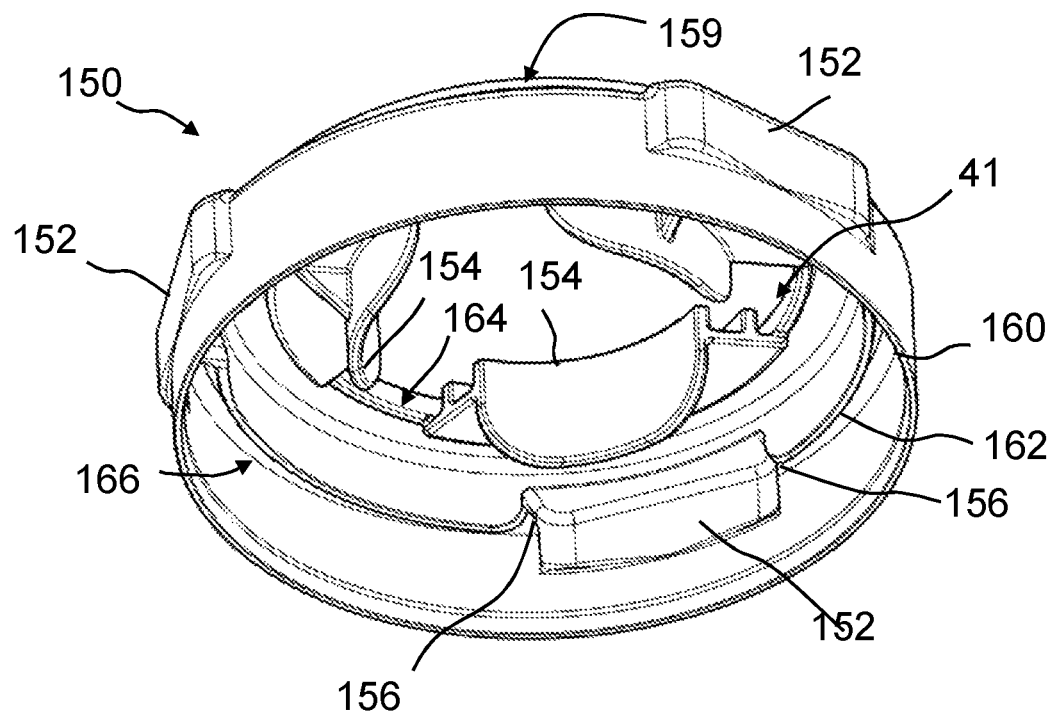
FIG. 17 shows an isometric illustration of a variant of the splash guard for the head connection part according to FIG. 6 with a view of its interior side.

According to the embodiment of the connection head 12 in the FIGS. 1 to 17, the circumferential wall 28 surrounds an upper part of the annular splash guard part 150. The splash guard part 150 is illustrated in FIGS. 14 and 15 in two different views. The FIGS. 16 and 17 show a variant of the splash guard part 150 in same views.

The splash guard part 150 serves for protection of the functional elements 44, 104 from splashing water and dust. The splash guard part 150 is formed from a vulcanized elastomer or a thermoplastic elastomer (TPE) and seals preferably radially against the connection head 12 and preferably axially against the rim 57 of the treatment unit 14. In the region of the support of the spring arms 53 of the pretension element 54, small cutouts 156 in the form of a groove are provided. Relative to the connection head 12, the splash guard part 150 is preferably held and clamped by the head connection part 32. As an alternative, the splash guard part 150 can also be joined to the connection head 12.

At the connection head 12, a cylindrical shoulder 29 is provided circumferentially which comprises an oversize in relation to the counter contour with the seal region 164 at the splash guard part 150 so that the splash guard part 150 is seated thereat with pretension for an improved sealing action. The seal region 164 seals preferably in radial direction against the shoulder 29. As an alternative, in an embodiment not illustrated the seal region 164 can be designed instead to seal in axial direction.

The splash guard part 150 projects outwardly circumferentially past the rim 57 with a lip 160. Within the rim 57, a further lip 162 is provided that serves during mounting for centering. The lips 160, 162 form a seal region 166 that preferably seals axially against the rim 57. The seal region 164 comprises a smaller diameter than the seal region 166. The lips 160, 162 extend approximately with the same length in axial direction, wherein the inner lip 162 extends axially slightly farther than the outer lip.

In addition, the splash guard part 150 can be supported by the circumferential wall 28 at the connection head 12 which additionally shields against splash water and protects the splash guard part 150 from mechanical damage.

The splash guard part 150 has an umbrella-type shape. It seals in this context on a small diameter against the connection head 12 and on a large diameter against the rim 57. In the regions in which the spring arms 53 of the pretension element 54 project toward the rim 57, the splash guard part 150 comprises a respective bulge 152 which covers the respective spring arm 53. In this context, in the closed state of the connection device 34, the outer straight section 55 of the spring arms 53 of the pretension element 54 is received in a groove between lips 160, 162 of the splash guard part 150. Between the seal regions 164 and 166, the splash guard part 150 comprises a membrane-type flexible region 159 that can be comprised of relatively thin material that is thinner than the material of the seal regions 164, 166. The improved flexibility and deformability in this region 159 facilitates mounting of the treatment unit 14 because reduced deformation forces and a reduced friction moment are acting during mounting at the filter head.

The region 164 between seal to the connection head 12 and the region 166 of the support relative to the rim 57 is preferably outwardly curved as in case of a membrane, with a reduced wall thickness for good deformability. The splash guard part 150 is pushed upwardly by approximately 1-4 mm when mounting the treatment unit 14. In the interior region, ribs 154, 158 can be provided that additionally clamp the splash guard part 150. The ribs 154, 158 are interrupted at the locations at which the thread elements 39 are arranged.

In the embodiment of the splash guard 150 in FIGS. 16 and 17, it can be seen that the outer lip 160 extends in axial direction significantly farther than the inner lip 162, arranged at the rim 57 of the housing pot 58 (FIG. 5). Since the outer lip 160 projects significantly axially past the rim 57 in the mounted state, laterally impacting splash water can be shielded better.

The treatment unit 14 is designed as a spin-on filter with a round cross section. It is substantially coaxial to the connection axis 20. The treatment unit 14 comprises a housing 56 with a housing pot 58 having a housing cover 60 fastened with its radially outer rim in the pot's open side by means of a crimp connection. A stable cover ring 61 is arranged on the housing cover 60 toward the connection head 12. A radially outer diameter of the housing 56 in the region of the housing cover 60 is smaller than a radial inner diameter of the splash guard part 150 of the connection head 12. The housing pot 58 comprises an outwardly curved housing bottom 62. The housing cover 60 and the housing pot 58 consist of metal. Optionally, the housing cover 60 can also be welded to the housing pot 58.

In the housing pot 58, a coaxial filter element 64 is arranged (FIGS. 3-5). The filter element 64 comprises a circumferentially closed filter medium folded to a filter bellows 66. At its end faces, the filter bellows 66 is connected seal-tightly to an attachment end disk 68, in the FIG. 1 at the top, and a counter end disk 70 at the bottom. The attachment end disk 68 is located at the side of the filter element 64 which is facing the housing cover 60.

The filter bellows 66 surrounds an element interior 72 of the filter element 64. The element interior 72 is located at a clean side of the filter element 64.

The counter end disk 70 closes off the element interior 72 at the end face of the filter element 64 which is facing the housing bottom 62. At the exterior side of the counter end disk 70 which is facing the housing bottom 62, a plurality of spring elements 74 are supported which are supported at the other end at the housing bottom 62.

In the counter end disk 70, a spring-loaded bypass valve (not illustrated) can be arranged which permits in the open state, under conditions that are not of interest here, an oil flow of motor oil from the housing bottom 62 directly into the element interior 72 by bypassing the filter element.

The filter element 64 is surrounded radially outwardly by a raw-side annular space 78 which is delimited by the radially inner circumferential side of the housing pot 58.

In the element interior 72, moreover a coaxial central tube (not illustrated) can extend between the counter end disk 70 and the attachment end disk 68. A circumferential wall of the central tube is permeable for the motor oil. A radially inner circumferential side, namely radially inner fold edges, of the filter bellows 66 can be supported at the radially outer circumferential side of the central tube.

The attachment end disk 68 comprises a coaxial outlet opening 82 for the filtered motor oil. At the radial inner circumferential side, the attachment end disk 68 is formed as a coaxial cylinder socket 83 which extends away axially from the element interior 72.

At the side of the cylinder socket 83 which is axially facing away from the element interior 72, an annular coaxial inner seal unit 84 is attached. The inner seal unit 84 is comprised of an elastomer.

Radially outwardly, the inner seal unit 84 comprises a return flow blocking membrane 86. The return flow blocking membrane 86 is annular and surrounds the cylinder socket 83 radially outwardly. The return flow blocking membrane 86 is resting under a mechanical pretension against the inner side of the housing cover 60 which is facing the filter bellows 66. It closes, as illustrated in FIG. 3, in the pressureless state a coaxial annular inlet opening 88 of the housing cover 60 for motor oil. As soon as motor oil is supplied to the treatment device 10, the return flow blocking membrane 86 opens due to the oil pressure in flow direction. A return flow of the motor oil through the inlet opening 88 is prevented by the return flow blocking membrane 86.

A radially inner annular section of the inner seal unit 84 forms a coaxial inner annular seal 90. The inner annular seal 90 is positioned with its radially outer circumferential side seal-tightly at the radially inner circumferential side of the cylinder socket 83. The inner annular seal 90 is positioned with its radially inner circumferential side, when the treatment unit 14 is mounted, seal-tightly at a radially outer circumferential side of the radially inner attachment socket 22 that is designed as a seal surface. With the inner annular seal 90, the clean side of the treatment unit 14 is separated from its raw side in the region of the inlet opening 88.

The housing cover 60 comprises in the region of the inlet opening 88 a stepped coaxial outer seal socket 92. A constriction of the outer seal socket 92 at its end which is facing away from the filter bellows 66 forms an outer seal groove 94 for an outer annular seal 96. The outer annular seal 96 is configured as an O-ring.

A radially outer diameter of the outer seal socket 92 outside of the region of the seal groove 94 corresponds approximately to the radial inner diameter of the outer attachment socket 24 of the connection head 12. When the treatment unit 14 is mounted, the seal socket 92 is seated in the outer attachment socket 24. The radially outer circumferential side of the outer seal socket 92 is then resting against the radially inner circumferential side of the radially outer attachment socket 24.

The outer seal groove 94 is covered at its side that is axially facing away from the filter bellows 66 by a cover ring 98. The cover ring 98 is connected by means of clamping tabs to the outer seal socket 92.

When the treatment unit 14 is mounted, the outer annular seal 96 is resting seal-tightly against the radially inner circumferential side of the radially outer attachment socket 24 that is designed as a seal surface. The outer annular seal 96 separates thus the oil-conducting region of the treatment device 10 from the connection space 30 and from the environment. For example, the annular seal 96 is positioned at the same level as the bayonet rings, i.e., the head connection part 32 and the housing connection part 100 of the connection device 34.

At the latest when the cover ring 98 arrives at the end face of the radially outer attachment socket 24 of the connection head 12 and/or the housing connection part 100 at the head connection part 32, the treatment unit 14 is rotated additionally 34 about the connection axis 20 in clockwise rotation direction, which is the closing rotation direction of the connection device.

As soon as the free ends of the housing-side functional elements 104 are positioned in the region of the corresponding head-side insertion gap 50, guiding of the respective housing-side slide regions 142 at the respective assembly ramps 43 of the functional elements 44 begins. The spring arms 53 of the pretension element 54 are supported with their free ends with the straight sections 55 at the rim 57 of the housing pot 58 in axial direction. Due to the pulling action achieved by the gradient of the assembly ramps 43 and of the slide regions 142 in axial direction between the functional elements 44 and 104, the inner annular seal 90 is pulled onto the radially inner attachment socket 22 and the outer annular seal 96 into the radially outer attachment socket 24.

As soon as the housing-side lock projections 106 abut against the corresponding head-side lock projections 46, a corresponding locking force must be overcome for further rotation. The locking force is realized in addition by the restoring force of the spring arms of the leaf spring 54.

After overcoming the locking force, the housing-side lock projections 116 lock behind the housing-side lock projections 46 and secure in this way the connection device 34 against accidental opening.

For separating the treatment unit 14 from the connection head 12, the treatment unit 14 is rotated in a left-handed rotation direction, i.e., in the opening rotation direction, about the connecting axis 20. For this purpose, first the locking force of the housing-side lock projections 106 with the head-side lock projections 46 must be overcome.

Under the spring pretension of the pretension element 54, the inner support regions 105 are guided along the corresponding support regions 45 of the head-side functional elements 44. Moreover, the outer housing-side support regions 105 are guided along the respective guide pins. In doing so, an axial pushing force on the outer housing-side support regions 105 is generated by the guide pins which act against a respective holding force of the inner annular seal 90 and of the outer annular seal 96. The holding forces are realized by the respective friction between the inner annular seal 90 and the inner attachment socket 22 and between the outer annular seal 96 and the outer attachment socket 24. By means of the pushing force, the inner annular seal 90 is pulled off the inner attachment socket 22 and the outer annular seal 96 out of the outer attachment socket 24 in axial direction, respectively.

As soon as upon further rotational movement the housing-side functional elements 104 leave the corresponding head-side insertion gaps 50, the treatment unit 14 is pulled off the connection head 12 with an axial movement.

In operation of the treatment device 10, i.e., in operation of the internal combustion engine, motor oil to be purified flows through the infeed 16, indicated by an arrow 112, into the annular inlet space 26. From here, the motor oil flows through the inlet opening 88, released by the return flow blocking membrane 86, into the raw-side annular space 78 of the filter housing 56. The motor oil to be purified flows through the filter bellows 66 from the exterior to the interior in radial direction and reaches the element interior 72 via the openings of the central tube 88. From the element interior 72, the purified motor oil flows through the outlet opening 82 and the radially inner attachment socket 22 of the connection head 12 to the drain 18. The purified motor oil leaves the connection head 12 and thus the treatment device 10 through the drain 18.

Figure 18:
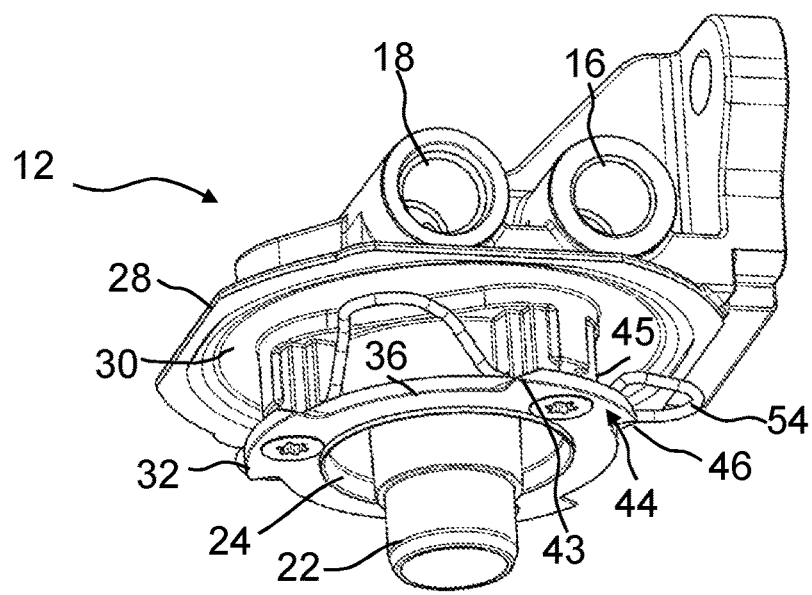
FIG. 18 shows an isometric illustration of a connection head of a treatment device according to a further embodiment of the invention.
Figure 19:
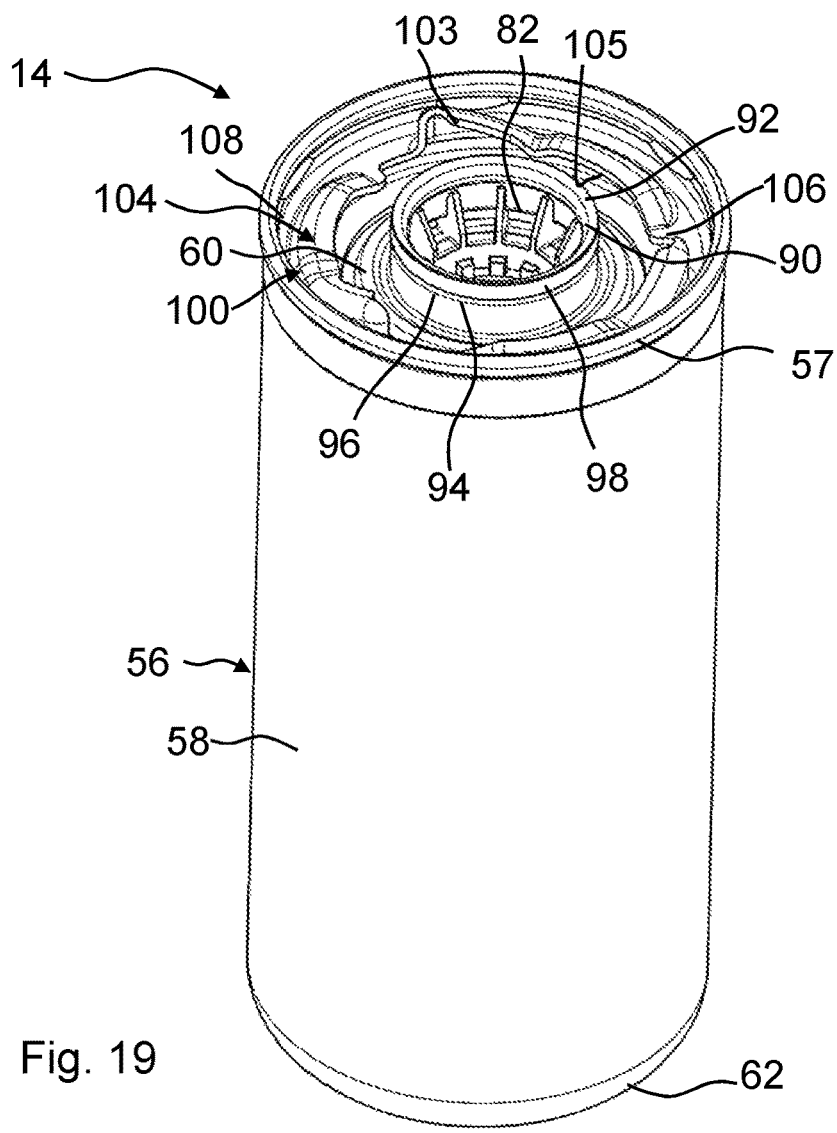
FIG. 19 shows an isometric illustration of a treatment unit of a treatment device according to a further embodiment of the invention with top view of the housing connection part for a connection head according to FIG. 18.
Figure 20:
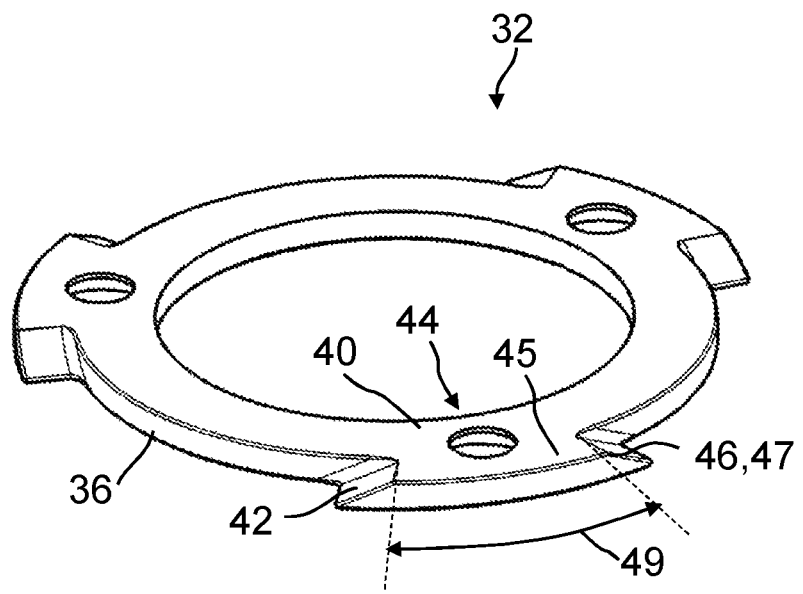
FIG. 20 shows in top view the head connection part for the connection head according to FIG. 18.
Figure 21:
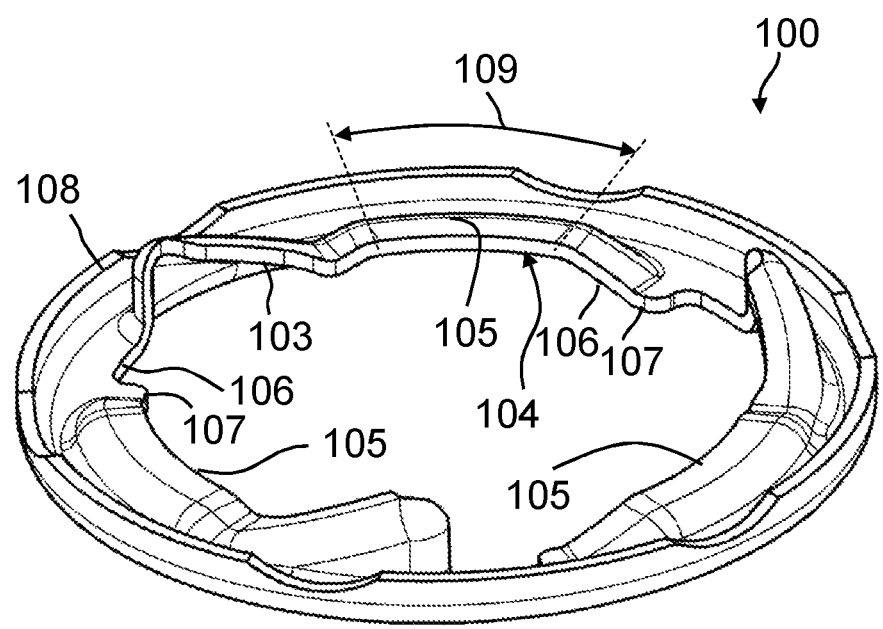
FIG. 21 shows in top view the housing connection part according to FIG. 18.

In the FIGS. 18 to 21, a second embodiment of a treatment device 10 in the form of a filter device is illustrated. Those elements that are similar to those of the first embodiment of the FIGS. 1 to 17 are provided with the same reference characters. FIG. 18 shows an isometric illustration of a connection head 12 of a treatment device 10, FIG. 19 shows an isometric illustration of a treatment unit 14 of the treatment device 10 with top view of the housing connection part 100 for the connection head 12 according to FIG. 18. FIG. 20 shows in isometric view the head connection part 32 for the connection head 12, and FIG. 21 shows in isometric view the housing connection part 100.

In this embodiment, the functions of the functional elements 44, 104 are switched. The housing connection section 100 comprises functional elements 104 with assembly ramps 103 which pass into straight support surfaces 105, respectively, that extend perpendicularly in relation to the connection axis 20.

The head connection part 32 comprises three functional elements with a respective slide region 42 (FIG. 20) which passes into a corresponding support surface 45. Selectively, the functional elements 44 can be embodied outwardly open in the head connection part 32, as illustrated in FIG. 20, or embodied open inwardly (not illustrated).

The number of functional elements 44, 104 can selectively also be four or five.

What is claimed is:

1. A treatment device for a fluid, the treatment device comprising:
    an exchangeable treatment unit comprising a housing, wherein the housing comprises a housing pot, a housing cover, at least one inlet for the fluid to be treated, and at least one outlet for the treated fluid;
    a connection head comprising at least one infeed for the fluid to be treated, wherein the at least one infeed is configured to be connected to the at least one inlet, and/or at least one drain for the treated fluid, wherein the at least one drain is configured to be connected to the at least one outlet;
    a detachable bayonet-type connection device configured to connect the connection head and the exchangeable treatment unit to each other by performing a plug-in/rotation movement about a connection axis of the treatment device;
    a splash guard part configured to at least cover the detachable bayonet-type connection device; wherein the splash guard part, between the connection head and the exchangeable treatment unit, comprises a first seal region and a second seal region, wherein the first seal region is configured to seal radially in relation to the connection axis or is configured to seal axially in relation to the connection axis, and wherein the second seal region is configured to seal axially in relation to the connection axis;
    wherein the detachable bayonet-type connection device comprises a housing connection part disposed at the housing and further comprises a head connection part disposed at the connection head, wherein the housing connection part and the head connection part are configured to operatively engage each other to form a connection of the detachable bayonet-type connection device;
    wherein the housing connection part comprises a mutually complementary functional element extending in a circumferential direction about the connection axis and the head connection part comprises a mutually complementary functional element extending in the circumferential direction about the connection axis, wherein the mutually complementary functional element of the housing connection part and the mutually complementary functional element of the head connection part are configured to operatively engage each other;
    wherein the detachable bayonet-type connection device comprises a pretension element configured to realize a mechanical pretension for pressing the mutually complementary functional elements of the housing connection part and of the head connection part against each other.

2. The treatment device according to claim 1, wherein the first seal region comprises a first diameter and the second seal region comprises a second diameter, wherein the first diameter is different from the second diameter.

3. The treatment device according to claim 1, wherein the second seal region comprises at least two seal lips spaced apart from each other in a radial direction in relation to the connection axis.

4. The treatment device according to claim 1, wherein the splash guard part comprises a membrane-type deformable region arranged between the first seal region and the second seal region, wherein a material of the membrane-type deformable region is thinner than a material of the first seal region and thinner than a material of the second seal region.

5. The treatment device according to claim 1, wherein the splash guard part comprises bulges configured to receive spring arms of the pretension element.

6. The treatment device according to claim 1, wherein the splash guard part comprises lips and a groove arranged between the lips, wherein the pretension element comprises spring arms each comprising an outer section received in the groove arranged between the lips of the splash guard part.

7. The treatment device according to claim 1, wherein the splash guard part is formed of a vulcanized elastomer or of a thermoplastic elastomer.

8. The treatment device according to claim 1, wherein the pretension element is secured by a component of the detachable bayonet-type connection device in the connection head or in the exchangeable treatment unit.

9. The treatment device according to claim 1, wherein the pretension element is a spring element comprising at least two radially outwardly projecting spring arms each comprising a radially outer end face comprising a straight section, wherein the straight section is oriented tangentially to a circular rim that extends in a circular shape about the connection axis.

10. The treatment device according to claim 9, wherein:
    the at least two radially outwardly projecting spring arms are arranged in the connection head and rest substantially flat on a rim of the housing pot, wherein the at least two radially outwardly projecting spring arms each form three contact points with the rim of the housing pot; or the at least two radially outwardly projecting spring arms are arranged in the exchangeable treatment unit and rest substantially flat on a rim of the connection head, wherein the at least two radially outwardly projecting spring arms each form three contact points with the rim of the connection head.

11. The treatment device according to claim 1, wherein one of the mutually complementary functional elements comprises an assembly ramp and a first support region that is perpendicular in relation to the connection axis, wherein the assembly ramp passes into the first support region; wherein the other one of the mutually complementary functional elements comprises a slide region and a second support region that is perpendicular in relation to the connection axis, wherein the second support region adjoins the slide region; wherein, in a connection end position of the connection of the detachable bayonet-type connection device, the first support region and second support region are positioned on top of each other in relation to the connection axis.

12. The treatment device according to claim 11, wherein a first end stop adjoins the first support region in the circumferential direction and a second end stop adjoins the second support region in the circumferential direction.

13. The treatment device according to claim 12, wherein the first end stop and the second end stop are lock elements of a lock safety device and the lock elements lock one behind the other, lock with each other, or lock in each other in a closed position of the detachable bayonet-type connection device.

14. The treatment device according to claim 11, wherein a total length of the first support region or of the second support region, measured in the circumferential direction about the connection axis on a selected radius, occupies at least 20% of a corresponding circumference of the housing connection part measured on the same selected radius and/or of a corresponding circumference of the head connection part measured on the same selected radius.

15. The treatment device according to claim 11, wherein a plurality of the first support region or of the second support region are provided and wherein a total length of the plurality of the first support regions or of the second support regions, measured in the circumferential direction about the connection axis on a selected radius, occupies at least 20% of a corresponding circumference of the housing connection part measured on the same selected radius and/or of a corresponding circumference of the head connection part measured on the same selected radius.

16. The treatment device according to claim 1, further comprising an outer annular seal arranged radially inside of the housing connection part.

17. The treatment device according to claim 1, wherein the exchangeable treatment unit and the connection head each comprise one or more correspondence elements, wherein the one or more correspondence elements of the exchangeable treatment unit correspond with the one or more correspondence elements of the connection head in one or more pairs of correspondence elements when the exchangeable treatment unit is mounted at the connection head.

18. The treatment device according to claim 17, wherein the one or more correspondence elements of the exchangeable treatment unit and the one or more correspondence elements of the connection head are sockets selected from the group consisting of attachment sockets, connection sockets, seal sockets, and cylinder sockets.

19. The treatment device according to claim 17, wherein the one or more pairs of correspondence elements include a first pair of correspondence elements and a second pair of correspondence elements, wherein the first pair of correspondence elements is arranged within the second pair of correspondence elements.

20. The treatment device according to claim 1, wherein the head connection part and/or the housing connection part consists of sheet metal or comprises sheet metal.

21. A treatment unit for a treatment device for a fluid, the treatment unit comprising:
a housing comprising a housing pot, a housing cover, at least one inlet for a fluid to be treated, and at least one outlet for the treated fluid;
wherein the treatment unit is configured to connect to a connection head of the treatment device by a detachable bayonet-type connection device by performing a plug-in/rotation movement about a connection axis of the treatment device;
wherein the housing comprises a housing connection part forming a part of the detachable bayonet-type connection device, wherein the housing connection part is configured to connect the treatment unit to a head connection part disposed at the connection head;
wherein the at least one inlet is configured to connect to an infeed of the connection head for the fluid to be treated and/or the at least one outlet is configured to connect to a drain of the connection head for the treated fluid;
wherein the housing connection part comprises a functional element extending in the circumferential direction about the connection axis and configured to operatively connect to a complementary functional element of the head connection part;
wherein the detachable bayonet-type connection device comprises a pretension element configured to realize a mechanical pretension for pressing the functional element of the housing connection part and the complementary functional element of the head connection part against each other;
a splash guard part at least covering the detachable bayonet-type connection device; wherein the splash guard part comprises a first seal region configured to seal radially in relation to the connection axis between the connection head and the treatment unit and further comprises a second seal region configured to seal axially in relation to the connection axis between the connection head and the treatment unit, wherein the first seal region comprises a first diameter and the second seal region comprises a second diameter, wherein the first diameter is different from the second diameter.

22. The treatment unit according to claim 21, wherein the second seal region comprises seal lips spaced apart in a radial direction in relation to the connection axis.

23. The treatment unit according to claim 21, wherein the splash guard part comprises bulges configured to receive spring arms of the pretension element.

24. The treatment unit according to claim 21, wherein the splash guard part comprises lips and a groove arranged between the lips, wherein the pretension element comprises spring arms each comprising an outer section received in the groove arranged between the lips of the splash guard part.

25. The treatment unit according to claim 21, wherein the splash guard part is formed of a vulcanized elastomer or of a thermoplastic elastomer.

26. The treatment unit according to claim 21, wherein the functional element of the housing connection part comprises a support region that is perpendicular in relation to the connection axis.

27. The treatment unit according to claim 26, wherein:
the functional element of the housing connection part comprises an assembly ramp passing into the support region that is perpendicular in relation to the connection axis, or
the functional element of the housing connection part comprises a slide region passing into the support region that is perpendicular in relation to the connection axis.

28. The treatment unit according to claim 26, wherein a total length of the support region, measured in the circumferential direction about the connection axis about a selected radius, occupies at least 20% of a corresponding circumference of the housing connection part measured on the same selected radius.

29. The treatment unit according to claim 26, wherein a plurality of the support region are provided and wherein a total length of the plurality of the support regions, measured in the circumferential direction about the connection axis about a selected radius, occupies at least 20% of a corresponding circumference of the housing connection part measured on the same selected radius.

30. A connection head for a treatment device for connecting to a treatment unit of the treatment device, the connection head comprising:
at least one infeed, configured to connect to at least one inlet of the treatment unit for a fluid to be treated, and/or at least one drain, configured to connect to at least one outlet of the treatment unit for a treated fluid;
wherein the connection head is configured to connect to the treatment unit by a detachable bayonet-type connection device by performing a plug-in/rotation movement about a connection axis of the treatment device;
wherein the connection head comprises a head connection part forming a part of the detachable bayonet-type connection device, wherein the head connection part is configured to connect the connection head to a housing connection part of the treatment unit;
wherein the head connection part comprises a functional element extending in the circumferential direction about the connection axis and configured to operatively connect to a complementary functional element of the housing connection part of the treatment unit;
wherein the detachable bayonet-type connection device comprises a pretension element configured to realize a mechanical pretension for pressing the functional element of the head connection part and the complementary functional element of the housing connection part against each other;
a splash guard part at least covering the detachable bayonet-type connection device; wherein the splash guard part comprises a first seal region configured to seal radially in relation to the connection axis between the connection head and the treatment unit and a second seal region configured to seal axially in relation to the connection axially between the connection head and the treatment unit, wherein the first seal region comprises a first diameter and the second on comprises a second diameter, wherein the first diameter is different from the second diameter.

31. The connection head according to claim 30, wherein the second seal region comprises seal lips spaced apart in a radial direction in relation to the connection axis.

32. The connection head according to claim 30, wherein the splash guard part comprises bulges configured to receive spring arms of the pretension element.

33. The connection head according to claim 30, wherein the splash guard part comprises lips and a groove arranged between the lips, wherein the pretension element comprises spring arms each comprising an outer section received in the groove arranged between the lips of the splash guard part.

34. The connection head according to claim 30, wherein the splash guard part is formed of a vulcanized elastomer or of a thermoplastic element elastomer.

35. The connection head according to claim 30, wherein the pretension element is secured by the head connection part in the connection head.

36. The connection head according to claim 30, wherein the functional element of the head connection part comprises a support region that is perpendicular in relation to the connection axis.

37. The connection head according to claim 36, wherein:
the functional element of the head connection part comprises an assembly ramp passing into the support region that is perpendicular in relation to the connection axis, or
the functional element of the head connection part comprises a slide region passing into the support region that is perpendicular in relation to the connection axis.

38. The connection head according to claim 36, wherein a total length of the support region, measured in the circumferential direction about the connection axis on a selected radius, occupies at least 20% of a corresponding circumference of the head connection part measured on the same selected radius.

39. The treatment unit according to claim 36, wherein a plurality of the support region are provided and wherein a total length of the plurality of the support regions, measured in the circumferential direction about the connection axis on a selected radius, occupies at least 20% of a corresponding circumference of the head connection part measured on the same selected radius.

* * * * *